(12) United States Patent
Kuo et al.

(10) Patent No.: US 12,111,154 B2
(45) Date of Patent: Oct. 8, 2024

(54) SHEET DETECTION DEVICE

(71) Applicant: KINPO ELECTRONICS, INC., New Taipei (TW)

(72) Inventors: Tsung-Hua Kuo, New Taipei (TW); Wei-Chun Jau, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 157 days.

(21) Appl. No.: 17/953,918

(22) Filed: Sep. 27, 2022

(65) Prior Publication Data
US 2024/0003670 A1 Jan. 4, 2024

(30) Foreign Application Priority Data
Jun. 30, 2022 (TW) ................... 111124513

(51) Int. Cl.
*G01B 7/32* (2006.01)
(52) U.S. Cl.
CPC ..................... *G01B 7/32* (2013.01)
(58) Field of Classification Search
CPC . G01B 7/32; G01B 7/003; G01B 5/02; B65H 2511/10; B65H 2511/20; B65H 2553/23; B65H 2553/61; B65H 2801/06; B65H 1/266; B65H 7/02; G01D 5/2412; G01D 2205/775
See application file for complete search history.

(56) References Cited

U.S. PATENT DOCUMENTS

2009/0273355 A1* 11/2009 Kitchens ............. H03K 17/975
                                                            324/679
2011/0089629 A1*  4/2011 Furusawa ................ B65H 7/14
                                                            271/227
(Continued)

FOREIGN PATENT DOCUMENTS

CN      101754919 A      6/2010
TW      201438456 A     10/2014
(Continued)

OTHER PUBLICATIONS

Office Action dated Jan. 31, 2023 of the corresponding Taiwan patent application No. 111124513.

*Primary Examiner* — Alvaro E Fortich
(74) *Attorney, Agent, or Firm* — Chun-Ming Shih; HDLS IPR SERVICES

(57) ABSTRACT

A sheet detection device includes a sheet guiding component, a conductor element and a sensing element. The sheet guiding component is disposed in a sheet tray and movable between an initial position and a threshold position along a first direction. The conductor element is disposed in the sheet tray, and is conductor continuously extended and disposed correspondingly between the initial position and the threshold position. The sensing element is disposed on and moved with the sheet guiding component, and is disposed in spaced with the conductor element and overlaps with at least a part of the conductor element. An overlapping portion between the conductor element and the sensing element correspondingly generates a capacitance value, and the capacitance value changes gradually corresponding to the movement of the sensing element along the first direction.

20 Claims, 22 Drawing Sheets

(56) References Cited

U.S. PATENT DOCUMENTS

2012/0237280 A1\* 9/2012 Yoshimura ......... G03G 15/6558
399/388
2013/0271795 A1\* 10/2013 Tsai ..................... B41J 11/0095
358/3.24
2021/0155429 A1\* 5/2021 Lee .......................... B65H 1/04

FOREIGN PATENT DOCUMENTS

| TW | I501622 B | 9/2015 |
| TW | 202120416 A | 6/2021 |

\* cited by examiner

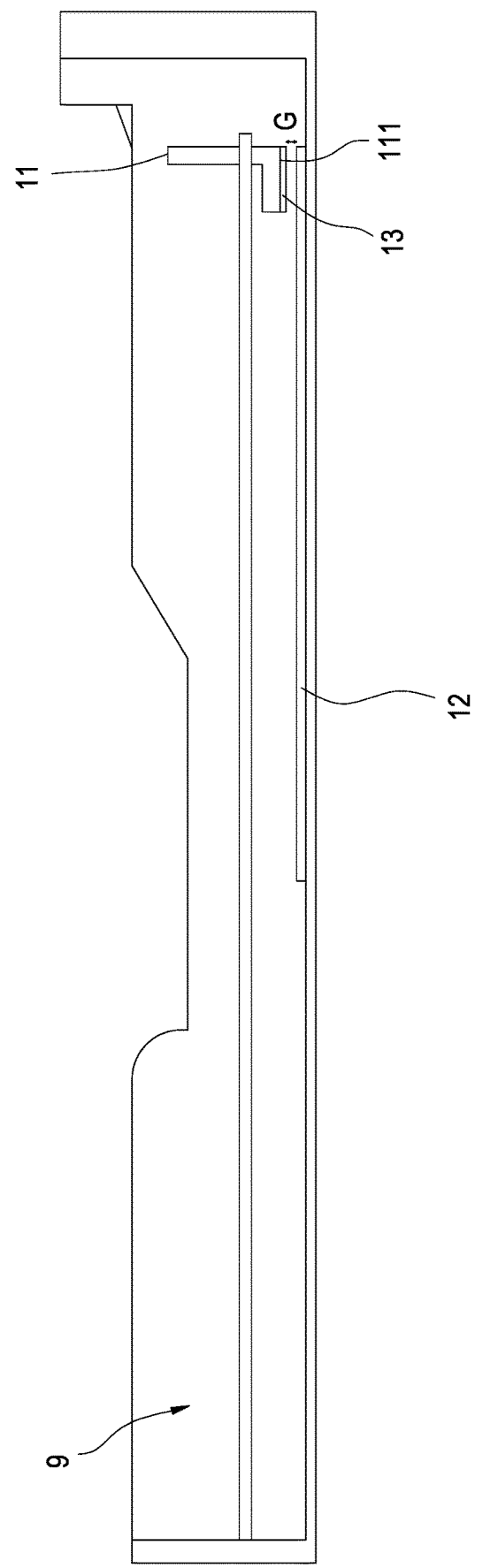

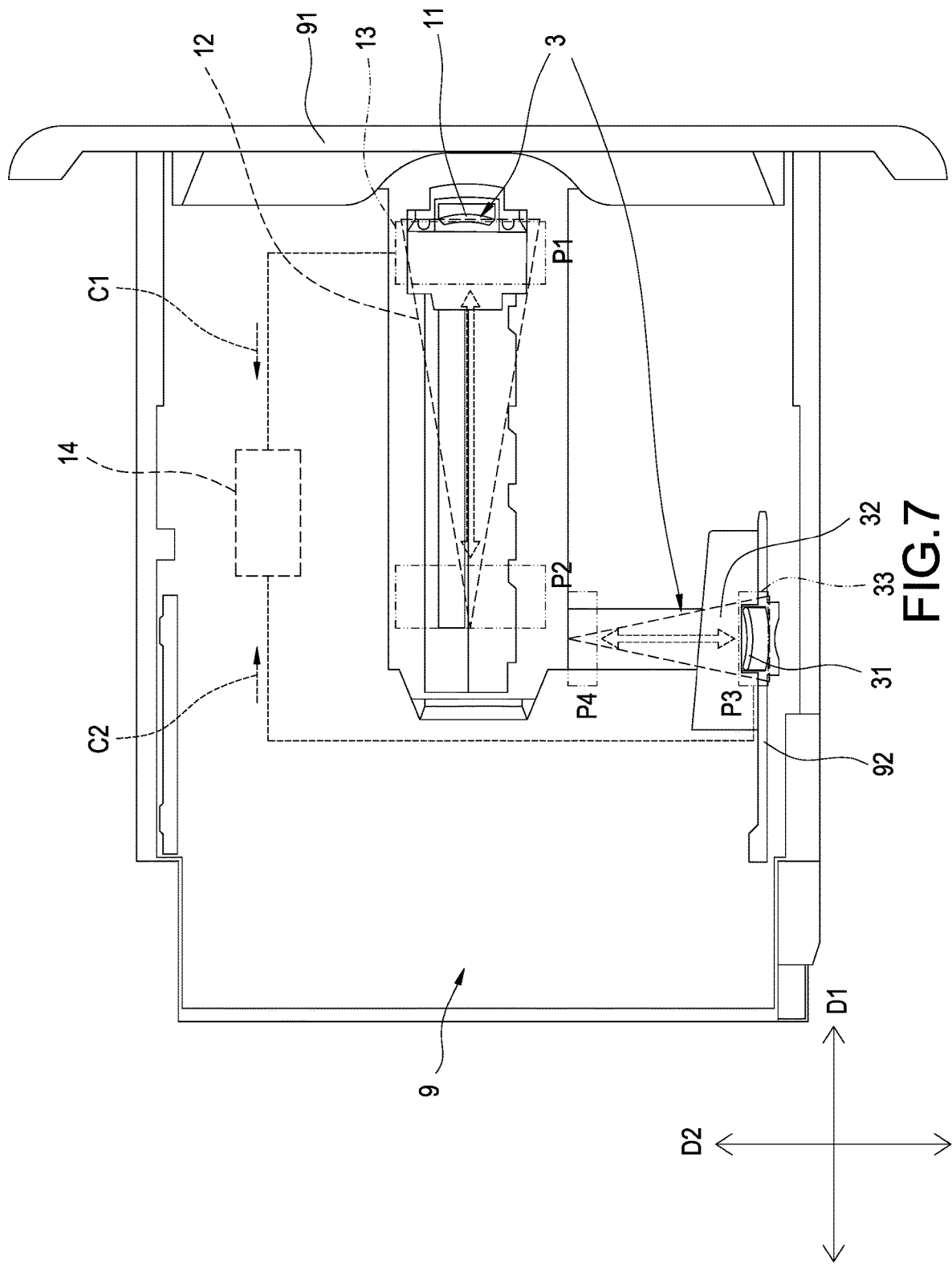

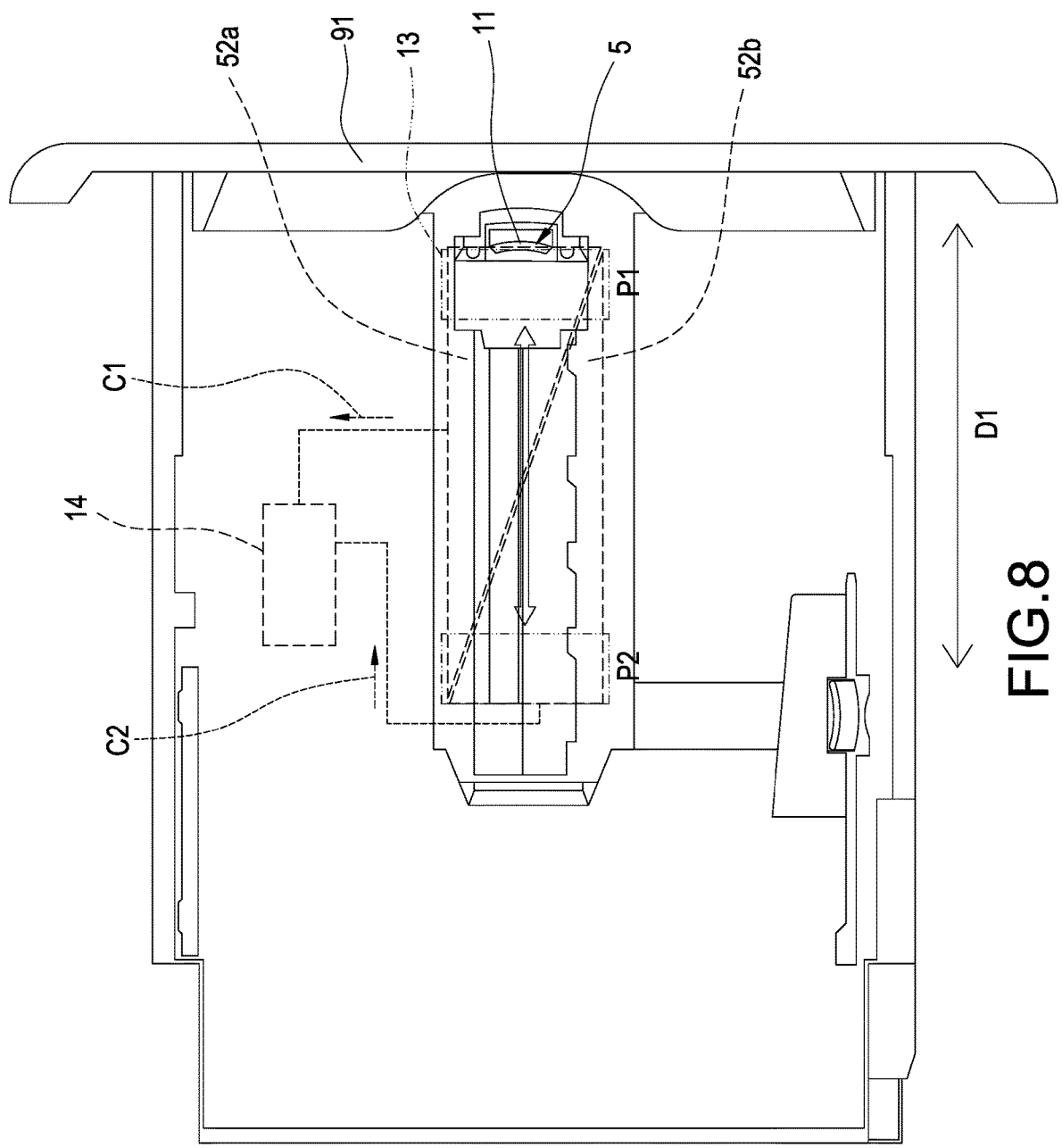

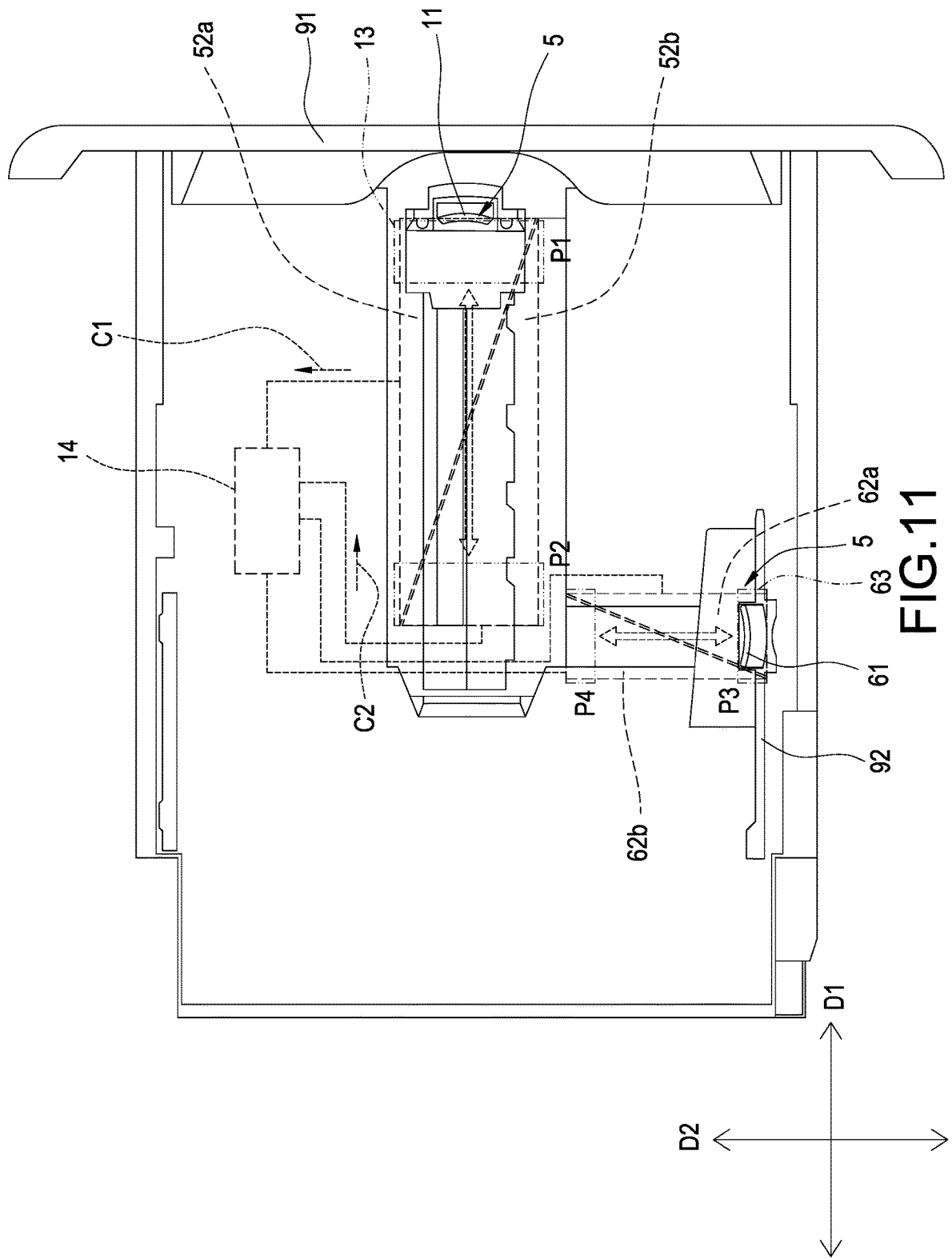

SHEET DETECTION DEVICE

BACKGROUND OF THE DISCLOSURE

Technical Field

The technical field relates to a detection device, particularly relates to a sheet detection device.

Description of Related Art

Many related-art electronic devices have a capacitance detection device. The principle is that all objects may be regarded as a conductor and a virtual capacitance may be formed between two objects. The factors influencing the capacitance value include the area, volume, material, shape, placing direction, object temperature and environment temperature, etc., of the object. The most important is that the distance and projection overlapping area between two objects may also influence the capacitance value. After calibrating and excluding the influence from environment, the distance between two objects may be obtained by converting the capacitance between the objects measured from the capacitance sensor.

Further, in the prior art of Taiwan invention patent No. TWI501622B, a capacitance sheet detection device including a sheet guiding component, a circuit board, a sensing element and a capacitance sensing processing unit is disclosed. A plurality of sensing regions not electrically connected to each other are disposed on the circuit board, and the sensing element is linked up with the sheet guiding component. When the sheet guiding component and the sensing element move, the sensing element detects the sensing region and the detected result is processed by the capacitance sensing processing unit to obtain the sheet size.

However, in the design concept of the prior art, the sensing element only detects "existing" or "non-existing", and thus the detection stages may only be defined based on the number of the sensing regions. "Non-stage" detection may not be achieved by the prior art and the detectable sheet size is limited by the designed number of the sensing regions. Moreover, the number of the sensing regions not electrically connected to each other is related to the requirement of how many sensing regions need to be electrically connected to external individually for the basis of determining "existing" or "non-existing", and thus the usage may be limited.

In view of this, how to provide a sheet detection device for increasing the freedom and precision of detecting sheet size is an important issue. The inventors have devoted themselves to the aforementioned prior art, researched intensively try to solve the aforementioned problems.

SUMMARY OF THE DISCLOSURE

The disclosure provides a sheet detection device, which may increase the freedom and precision of detecting sheet size.

In one of the exemplary embodiments, a sheet detecting device including a first sheet guiding component, a first conductor element and a first sensing element is provided. The first sheet guiding component is disposed in a sheet tray, and movable between an initial position and a threshold position along a first direction. The first conductor element is disposed in the sheet tray along the first direction, is conductor continuously extended, and is arranged correspondingly between the initial position and the threshold position. The first sensing element is disposed on and linked up with the first sheet guiding component, and is disposed in spaced with the first conductor element and overlaps with at least a part of the first conductor element. A first overlapping portion between the first conductor element and the first sensing element correspondingly generates a first capacitance value, and the first capacitance value changes gradually corresponding to movement of the first sensing element along the first direction.

In some embodiments, the sheet detecting device further includes a processing element, electrically connected with the first sensing element or the first conductor element, and configured to receive the first capacitance value.

In some embodiments, an overlapping area of the first overlapping portion is less than a sensing area of the first sensing element.

In some embodiments, the sheet detecting device further includes a second conductor element, disposed in the sheet tray along the first direction, being conductor continuously extended, arranged correspondingly between the initial position and the threshold position, and disposed adjacently to the first conductor element.

In some embodiments, a second overlapping portion between the second conductor element and the first sensing element correspondingly generates a second capacitance value, and the second capacitance value changes gradually corresponding to movement of the first sensing element along the first direction.

In some embodiments, the sheet detecting device further includes a processing element, electrically connected with the first conductor element and the second conductor element, and configured to receive the first capacitance value and the second capacitance value.

In some embodiments, when the first sensing element is located at the initial position or the threshold position on the first direction, the first capacitance value is different from the second capacitance value.

In some embodiments, when the first capacitance value increases gradually, the second capacitance value decreases gradually.

In some embodiments, a combined shape from the first overlapping portion and the second overlapping portion is substantially same with a shape of the first sensing element.

In some embodiments, the first capacitance value increases or decreases in a linear, a curve, or a stepped manner.

In some embodiments, the sheet detecting device further includes: a second sheet guiding component, disposed in the sheet tray, and movable between an initial position and a threshold position along a second direction, wherein the second direction is perpendicular to the first direction; a third conductor element, disposed in the sheet tray along the second direction, being conductor continuously extended, and arranged correspondingly between the initial position and the threshold position along the second direction; and a second sensing element, disposed on and linked up with the second sheet guiding component, and disposed in spaced with the third conductor element and overlapping with at least a part of the third conductor element. A third overlapping portion between the third conductor element and the second sensing element correspondingly generates a third capacitance value, and the third capacitance value changes gradually corresponding to movement of the second sensing element along the second direction.

In some embodiments, the sheet detecting device further includes a fourth conductor element, disposed in the sheet tray along the second direction, being conductor continuously extended, arranged correspondingly between the initial position and the threshold position along the second direction, and disposed adjacently to the third conductor element.

In some embodiments, a fourth overlapping portion between the fourth conductor element and the second sensing element correspondingly generates a fourth capacitance value, and the fourth capacitance value changes gradually corresponding to movement of the second sensing element along the second direction.

In one of the exemplary embodiments, a sheet detecting device including a first sheet guiding component, a plurality of conductor elements and a first sensing element is provided. The first sheet guiding component is disposed in a sheet tray, and is movable between an initial position and a threshold position along a first direction. Each conductor element is disposed in the sheet tray along the first direction and is conductor continuously extended, and the conductor elements are arranged correspondingly between the initial position and the threshold position. The first sensing element is disposed on and linked up with the first sheet guiding component, and is disposed in spaced with the conductor elements and overlaps with at least a part of the conductor elements. An overlapping portion between each conductor element and the first sensing element correspondingly generates a first capacitance value, and a first capacitance ratio of a plurality of first capacitance values of the conductor elements is substantially equal to a first predetermined value, corresponding to the first sensing element moves along the first direction.

In some embodiments, the sheet detecting device further includes a processing element, electrically connected with the conductor elements, and configured to receive the first capacitance values.

In some embodiments, when the first sensing element is located at the initial position or the threshold position on the first direction, the first capacitance values are different from one another.

In some embodiments, a combined shape from a plurality of overlapping portions between the conductor elements and the first sensing element is substantially same with a shape of the first sensing element.

In some embodiments, a total area of the overlapping portions is less than a sensing area of the first sensing element.

In some embodiments, the sheet detecting device further includes: a second sheet guiding component, disposed in the sheet tray, and movable between an initial position and a threshold position along a second direction, wherein the second direction is perpendicular to the first direction; and a second sensing element, disposed on and linked up with the second sheet guiding component. The conductor elements are also disposed along the second direction and arranged correspondingly between the initial position and the threshold position along the second direction, the second sensing element is disposed in spaced with the conductor elements and overlaps with at least a part of the conductor elements. An overlapping portion between each conductor element and the second sensing element correspondingly generates a second capacitance value, and a second capacitance ratio of a plurality of second capacitance values of the conductor elements is substantially equal to a second predetermined value, corresponding to the second sensing element moves along the second direction.

In some embodiments, a combined shape from a plurality of overlapping portions between the conductor elements and the second sensing element is substantially same with a shape of the second sensing element.

In summary, the conductor element of the sheet detection device of the disclosure is disposed in the sheet tray, and is continuously extended between the initial position and the threshold position where the sheet guiding component is movable. The sensing element disposed on the sheet guiding component overlaps with at least a part of the conductor element to generate the capacitance value. Therefore, when the sensing element moves along the first direction, the capacitance value between the sensing element and the conductor element increases or decreases gradually. As a result, when the sheet guiding component correspondingly abuts against the sheet in any size to be located at any position, the capacitance value is generated between the sensing element and the conductor element, and the sheet size may be precisely detected based on the capacitance value.

BRIEF DESCRIPTION OF THE DRAWINGS

FIG. 2 is a cross sectional diagram of the sheet detection device along line A-A in FIG. 1.

FIG. 7 is a schematic diagram of a sheet detection device in accordance with the fourth embodiment of the disclosure.

FIG. 8 is a schematic diagram of a sheet detection device in accordance with the fifth embodiment of the disclosure.

FIG. 11 is a schematic diagram of a sheet detection device in accordance with the sixth embodiment of the disclosure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
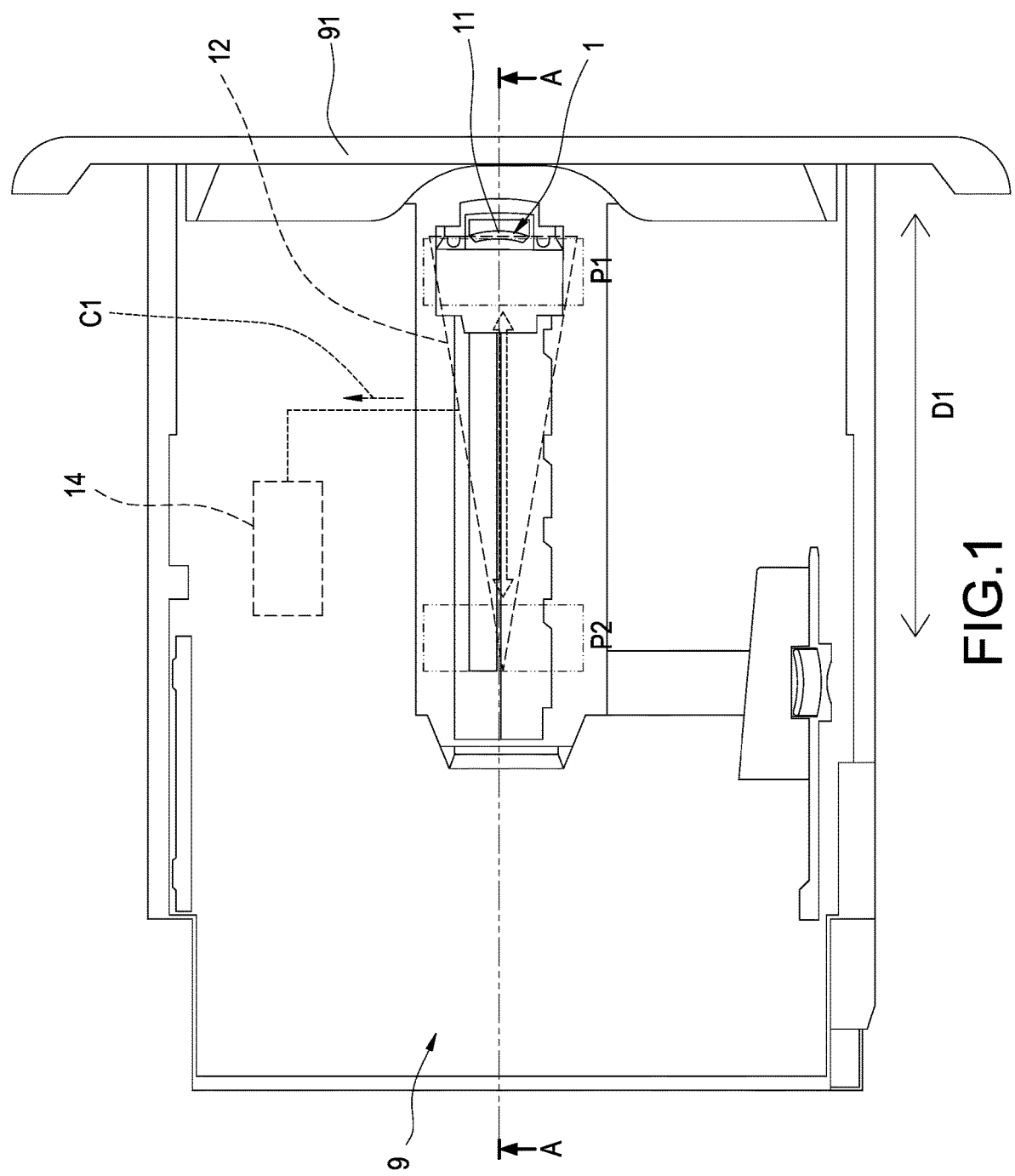
FIG. 1 is a schematic diagram of a sheet detection device in accordance with the first embodiment of the disclosure.

FIG. 1 is a schematic diagram of a sheet detection device 1 in accordance with the first embodiment of the disclosure. FIG. 2 is a cross sectional diagram of the sheet detection device 1 along line A-A in FIG. 1.

The sheet detection device 1 of the disclosure may be, for example, disposed cooperatively with the sheet tray 9 of the printer (not shown in figures). The sheet detection device 1 in the first embodiment of the disclosure includes a sheet guiding component (for example, first sheet guiding component) 11, a conductor element (for example, first conductor element) 12 and a sensing element (for example, first sensing element) 13.

The sheet guiding component 11 is disposed in the sheet tray 9, and is movable between an initial position P1 and a threshold position P2 along a first direction D1. In some embodiments, the first direction D1 may be, for example, the long-side (or long-axis) direction of the sheet tray 9. The initial position P1 is the outermost position of sheet guiding component 11 in the sheet tray 9, for example, the position where the sheet guiding component 11 abuts against the side wall 91 of the sheet tray 9. The threshold position P2 is the final position that the sheet guiding component 11 may move to in the sheet tray 9 along the first direction D1, namely, the farthest position of the sheet guiding component 11 moving along the first direction D1 from the side wall 91 of the sheet tray 9. It should be noted that the user may make the sheet guiding component 11 move along the first direction D1, and make the sheet guiding component 11 stop at any position between the initial position P1 and the threshold position P2.

The conductor element 12 is disposed in the sheet tray 9. The conductor element 12 is designed to be a conductor continuously extended and conductive in full-sheet based on the demands, and arranged correspondingly between the initial position P1 and the threshold position P2 along the first direction D1. The conductor element 12 may be, for example, disposed on the bottom side or side wall of the sheet tray 9. In some embodiments, when the conductor element 12 is disposed on the bottom side of the sheet tray 9, the conductor element 12 is located below the sheet guiding component 11 correspondingly. In some other embodiments, when the conductor element 12 is disposed on the side wall of the sheet tray 9, the conductor element 12 is correspondingly located adjacent to the sheet guiding component 11 on the lateral side (not shown in figures). It should be noted that, in FIG. 1, the shape of the conductor element 12 is using an isosceles triangle as an example, and the bottom edge of the isosceles triangle is disposed adjacently to the side wall 91 (that is, the initial position P1) of the sheet tray 9 and the side edges of the isosceles triangle are extended toward the threshold position P2 along the first direction D1, here is not intended to be limiting. The conductor element 12 is not limited to be extended from the initial position P1 to the threshold position P2, and size of the conductor element 12 may be adjusted depending on the demands.

Figure 3A:
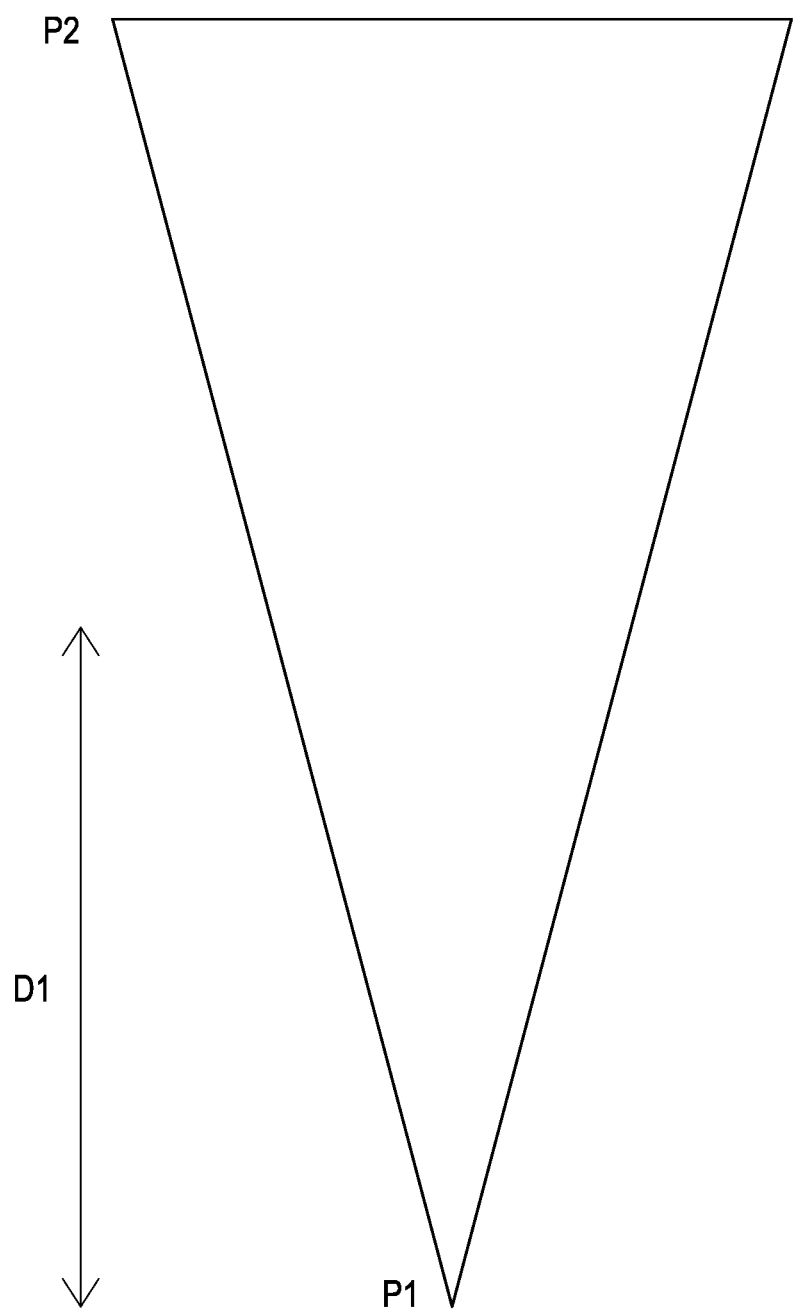
FIG. 3A to FIG. 3E are schematic diagrams of different types of conductor elements of the disclosure.
Figure 3B:
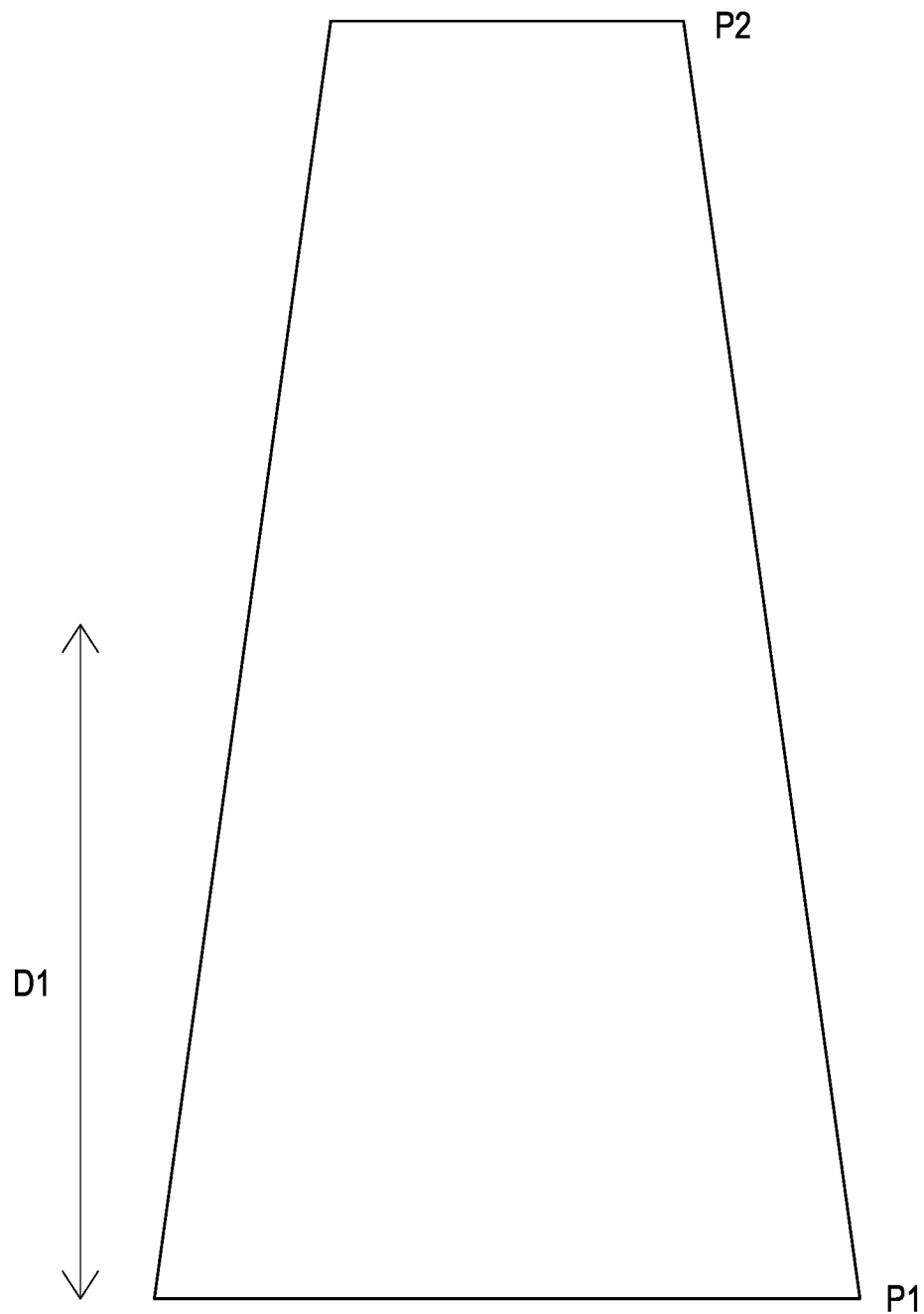
Figure 3C:
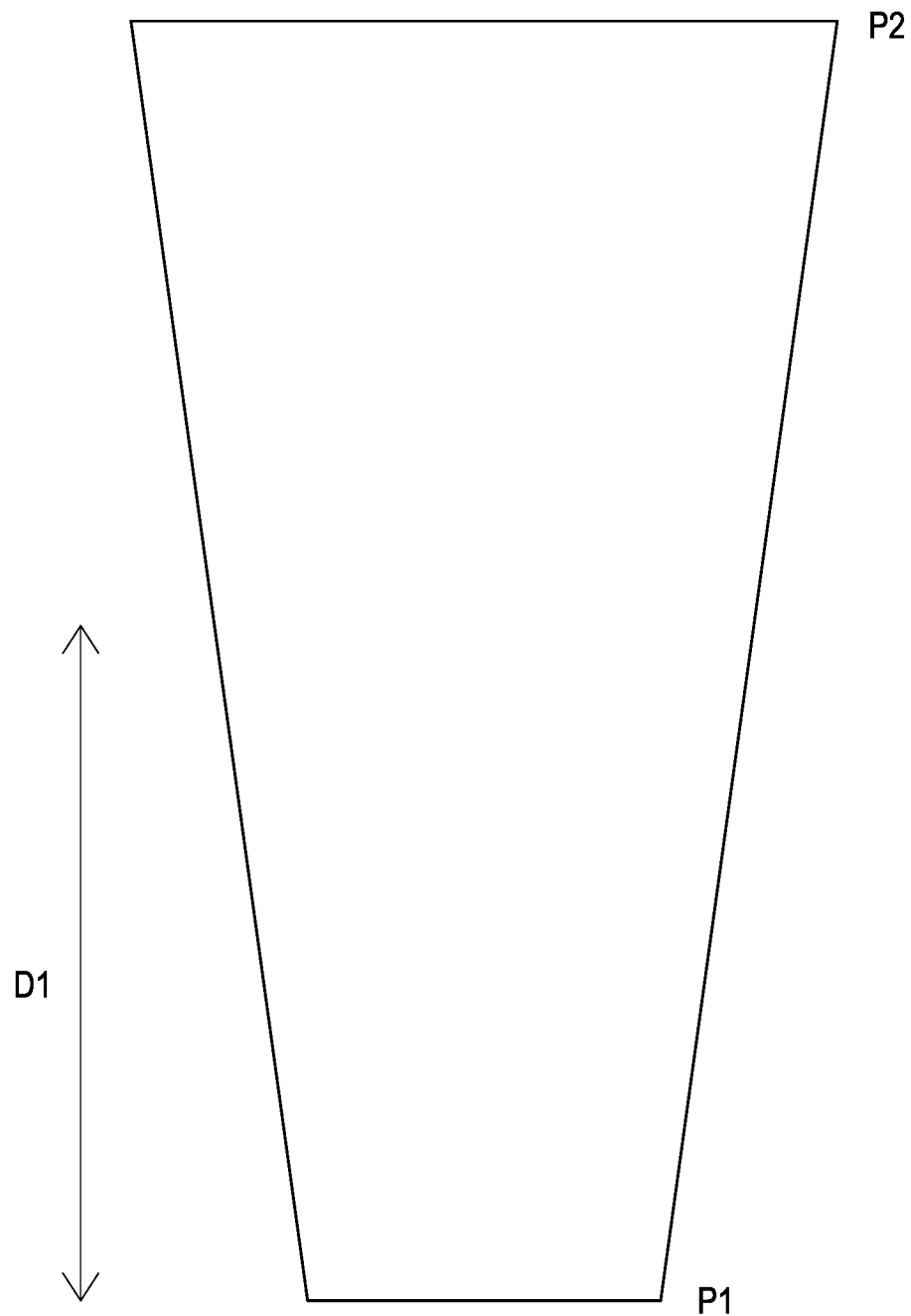
Figure 3D:
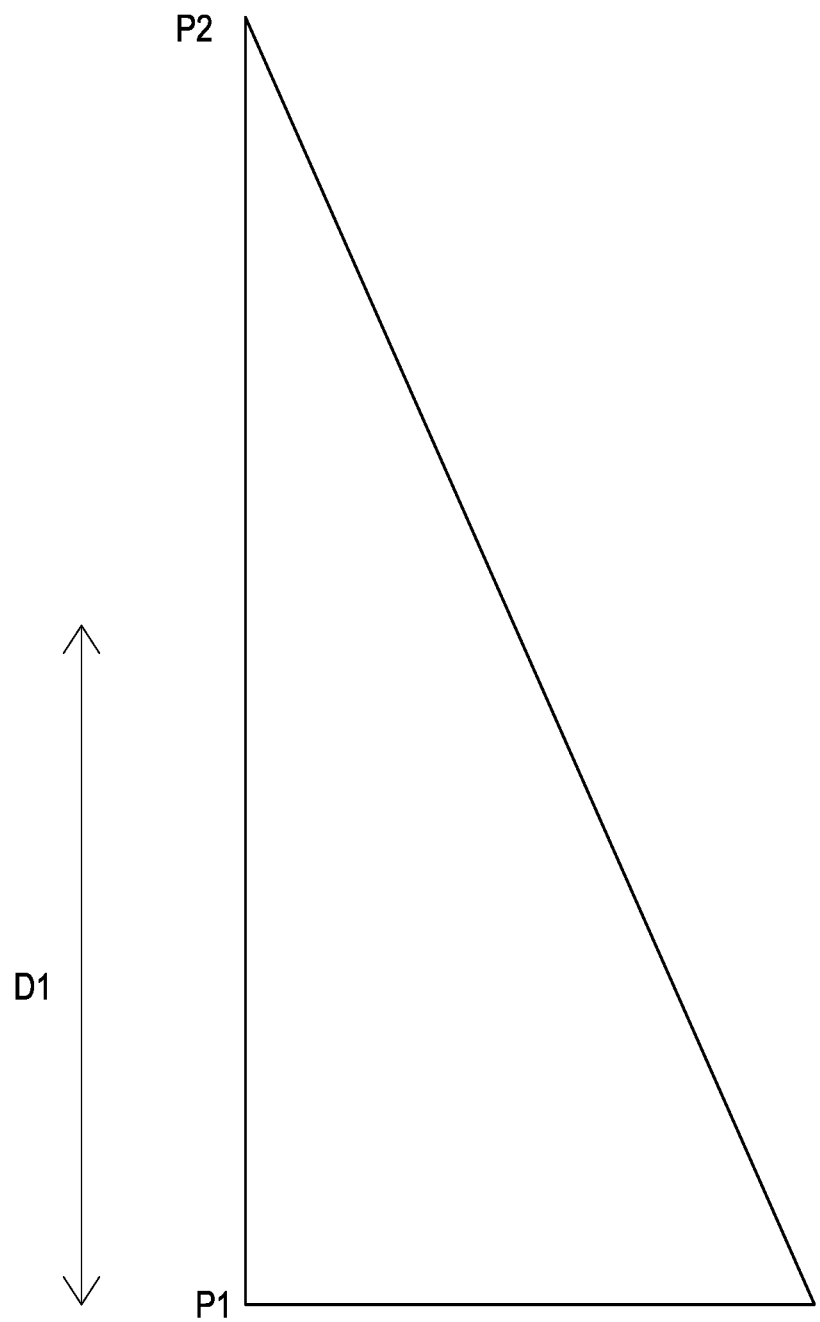
Figure 3E:
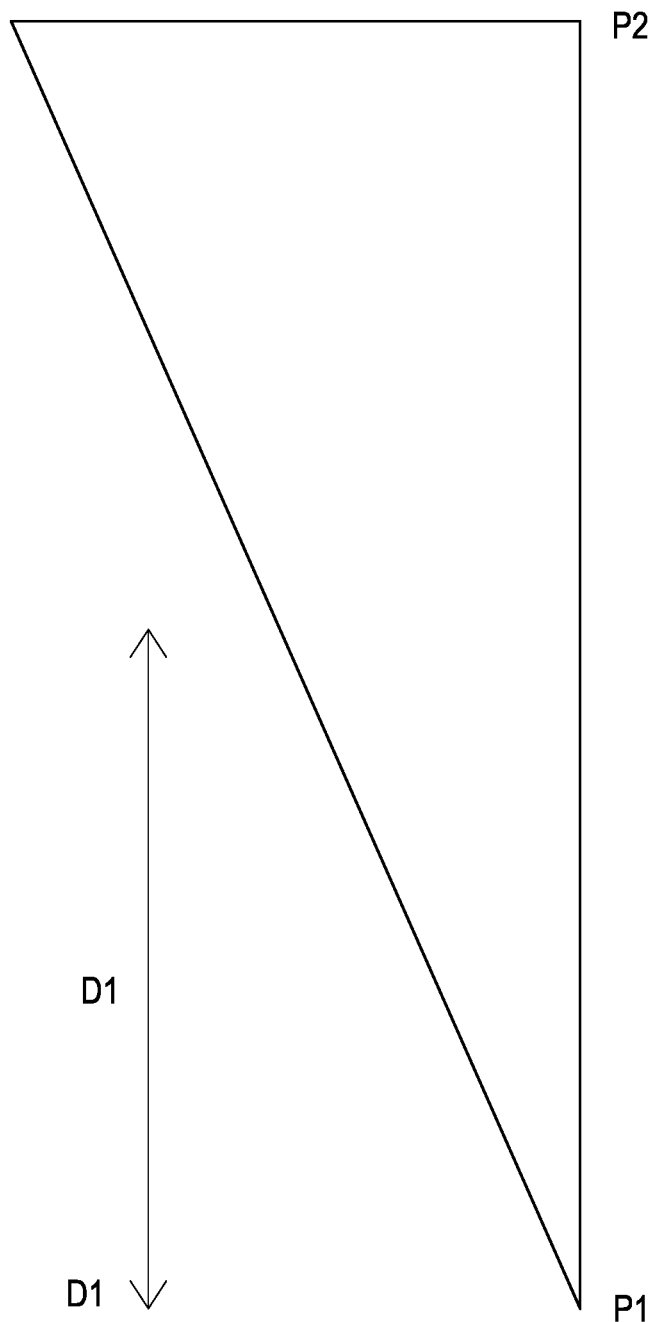

FIG. 3A to FIG. 3E are schematic diagrams of different types of conductor elements 12a-12e of the disclosure. As shown in FIG. 3A, the shape of the conductor element 12a is the isosceles triangle, and the bottom edge of the isosceles triangle is disposed on the threshold position P2 and the side edges of the isosceles triangle are extended toward the initial position P1 along the first direction D1. As shown in FIG. 3B, the shape of the conductor element 12b is a trapezoid, the long bottom edge of the trapezoid is disposed on the initial position P1, the side edges of the trapezoid are extended toward the threshold position P2 along the first direction D1, and the short top edge of the trapezoid is disposed on the threshold position P2. As shown in FIG. 3C, the shape of the conductor element 12c is the trapezoid, the long bottom edge of the trapezoid is disposed on the threshold position P2, the side edges of the trapezoid are extended toward the initial position P1 along the first direction D1, and the short top edge of the trapezoid is disposed on the initial position P1. As shown in FIG. 3D, the shape of the conductor element 12d is a right triangle, the bottom edge of the right triangle is disposed on the initial position P1 and the side edges of the right triangle are extended toward the threshold position P2 along the first direction D1. As shown in FIG. 3E, the shape of the conductor element 12e is the right triangle, the bottom edge of the right triangle is disposed on the threshold position P2 and the side edges of the right triangle are extended toward the initial position P1 along the first direction D1.

It is worth mentioning that the shape of the conductor element is not limiting, the main requirement is that the area is gradually increased or decreased along the first direction (that is, the long-side direction of the sheet tray). For example, the other embodiments are shown the FIG. 4C and FIG. 4E hereafter.

Referring back to FIG. 1 and FIG. 2, the sensing element 13 is disposed on and linked up with the sheet guiding component 11. The sensing element 13 is disposed in spaced with the conductor element 12 and overlaps with at least a part of the conductor element 12. In some embodiments, the sensing element 13 is, for example, made of conductor material. When the conductor element 12 is disposed on the bottom side of the sheet tray 9, the sensing element 13 is disposed on the bottom side 111 of the sheet guiding component 11 and configured to move along the first direction D1 following the sheet guiding component 11. In some other embodiments, When the conductor element 12 is disposed on the side wall of the sheet tray 9, the sensing element 13 may be disposed on the lateral side of the sheet guiding component 11 through an extending structure (not shown in figures) to keep a predetermined distance with the conductor element 12, and configured to move along the first direction D1 following the sheet guiding component 11. The shape of the sensing element 13 may be corresponding to the shape of the bottom side 111 of the sheet guiding component 11, here is not intended to be limiting. A gap G is defined between the sensing element 13 and the conductor element 12. In some embodiments, the gap G may be, for example, greater than or equal to 3 mm, and less than or equal to 10 mm. The main requirement is to obtain desirable capacitance value between the sensing element 13 and the conductor element 12, here is not intended to be limiting.

Further, under top view, the sensing element 13 overlaps with at least a part of the conductor element 12. The overlapping portion (for example, first overlapping portion) between the conductor element 12 and the sensing element 13 generates a capacitance value (for example, first capacitance value) C1 correspondingly. In some embodiments, the overlapping area of the overlapping portion between the conductor element 12 and the sensing element 13 is less than the sensing area of the sensing element 13. In other words, no matter where the sensing element 13 is located, at least a part of the sensing element 13 is not overlapped with the conductor element 12. As a result, the desirable capacitance value may be obtained between the sensing element 13 and the conductor element 12.

In some embodiments, the sheet detection device 10 may further include a processing element 14. The processing element 14 may be electrically connected with the sensing element 13 or the conductor element 12, and configured to receive the capacitance value C1. The processing element 14 may include a sensor integrated circuit, a microcontroller unit (MCU), a microprocessor unit (MPU), a central processing unit (CPU), an application-specific integrated circuit (ASIC), a digital signal processor (DSP), a graphics processing unit (GPU), a field programmable gate array (FPGA), and/or a system on a chip (SoC), etc. This embodiment uses the processing element 14 to be electrically connected with the conductor element 12 as an example, here is not intended to be limiting.

Figure 4A:
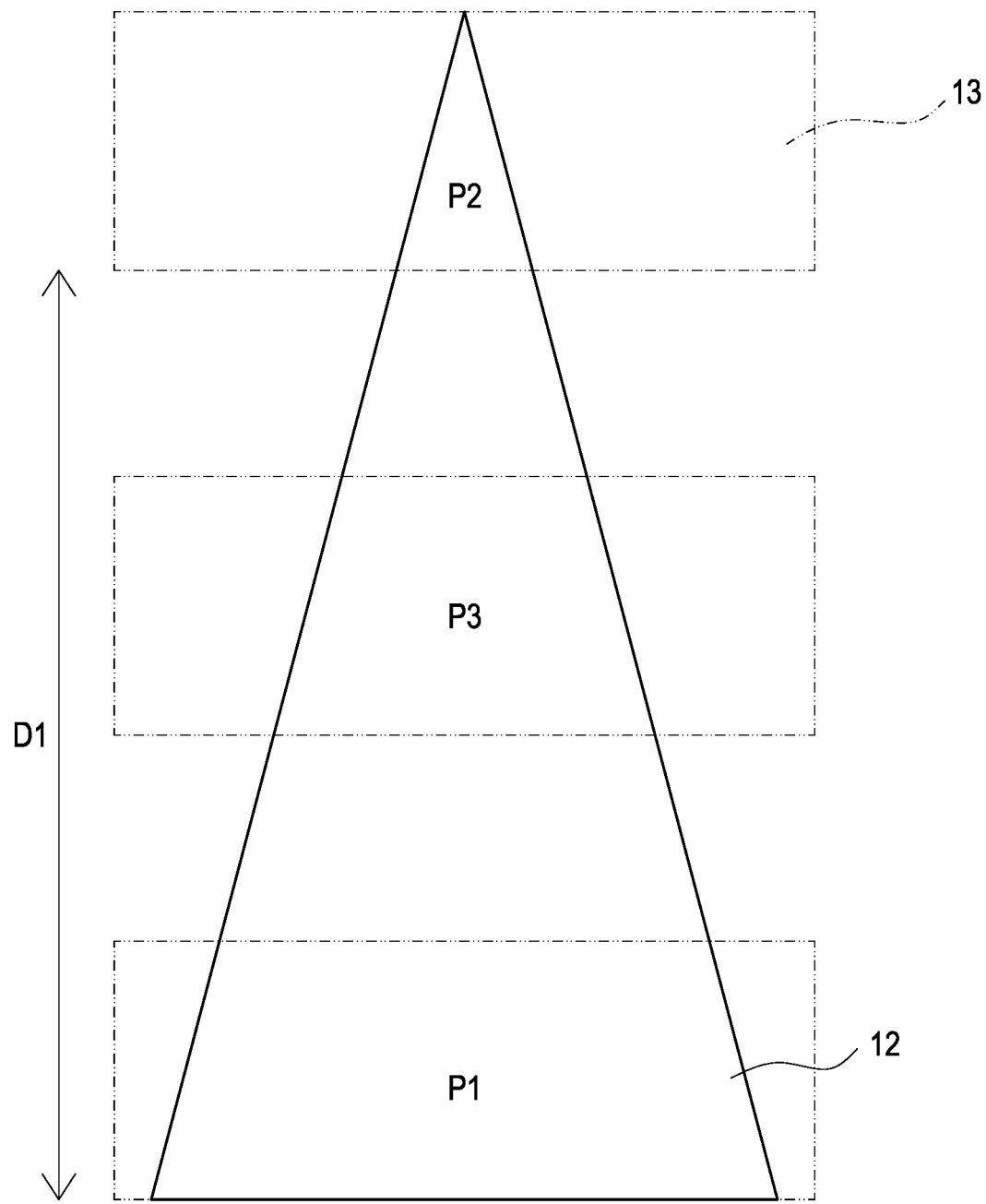
FIG. 4A is a schematic diagram of the overlapping portion between the conductor element and the sensing element of the disclosure.
Figure 4B:
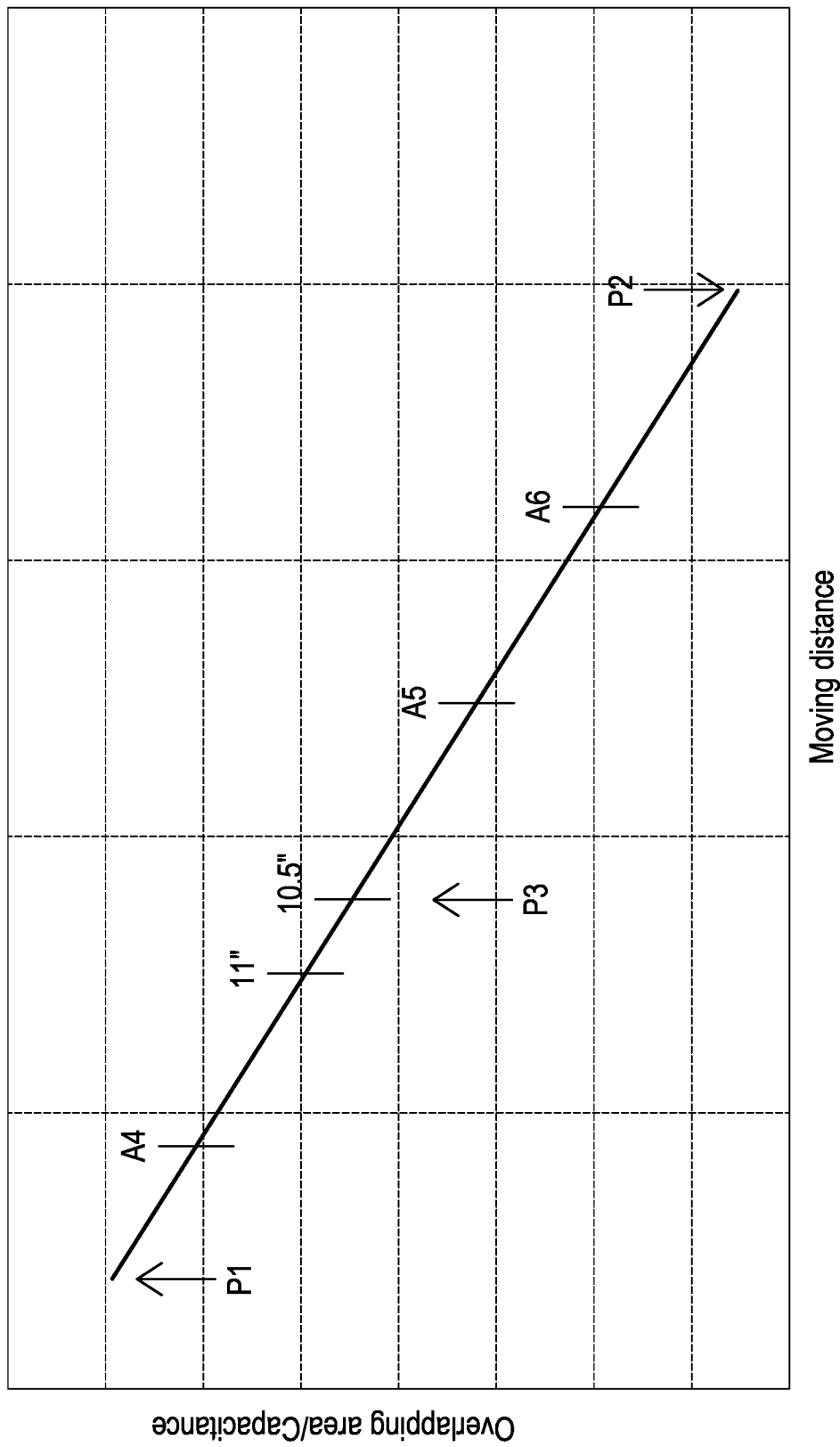
FIG. 4B is a schematic diagram of the capacitance change corresponding to the overlapping portion between the conductor element and the sensing element of the disclosure.

FIG. 4A is a schematic diagram of the overlapping portion between the conductor element 12 and the sensing element 13 of the disclosure. FIG. 4B is a schematic diagram of the capacitance change corresponding to the overlapping portion between the conductor element 12 and the sensing element 13 of the disclosure.

Referring to FIG. 1, FIG. 4A and FIG. 4B, when the user pushes the sheet guiding component 11 to reciprocate along the first direction D1 to abut against the sheet, the sensing element 13 moves together with the sheet guiding element 11. The capacitance value C1 changes gradually with respect to the reciprocating of the sensing element 13 along the first direction D1. In some embodiments, the gradual changing may be, for example, increasing or decreasing in a linear manner. In other words, the overlapping area between the conductor element 12 and the sensing element 13 increases or decreases with respect to the reciprocating of the sensing element 13 along the first direction D1 in a linear manner. The processing element 14 is configured to receive the capacitance value C1 corresponding to the overlapping area.

For example, when the sensing element 13 is located at the initial position P1, the overlapping area between the conductor element 12 and the sensing element 13 is largest, and thus the capacitance value C1 between the conductor element 12 and the sensing element 13 is largest. When the processing element 14 receives the capacitance value C1, the processing element 14 is configured to determine that the sheet guiding component 11 is located at the initial position P1 according to the capacitance value C1. For another example, when the sensing element 13 is located at the threshold position P2, the overlapping area between the conductor element 12 and the sensing element 13 is smallest, and thus the capacitance value C1 between the conductor element 12 and the sensing element 13 is smallest. When the processing element 14 receives the capacitance value C1, the processing element 14 is configured to determine that the sheet guiding component 11 is located at the threshold position P2 according to the capacitance value C1. For another example, when the sensing element 13 is located at any position P3, the overlapping area between the conductor element 12 and the sensing element 13 is similarly corresponding to one capacitance value C1. When the processing element 14 receives the capacitance value C1, the processing element 14 is configured to determine where the sheet guiding component 11 is located according to the capacitance value C1.

Therefore, by pre-setting the capacitance value C1 corresponding to the overlapping area between the conductor element 12 and the sensing element 13, the processing element 14 may determine the sheet size of the sheet being abutted against by the sheet guiding component 11 according to the capacitance value C1.

Figure 4C:
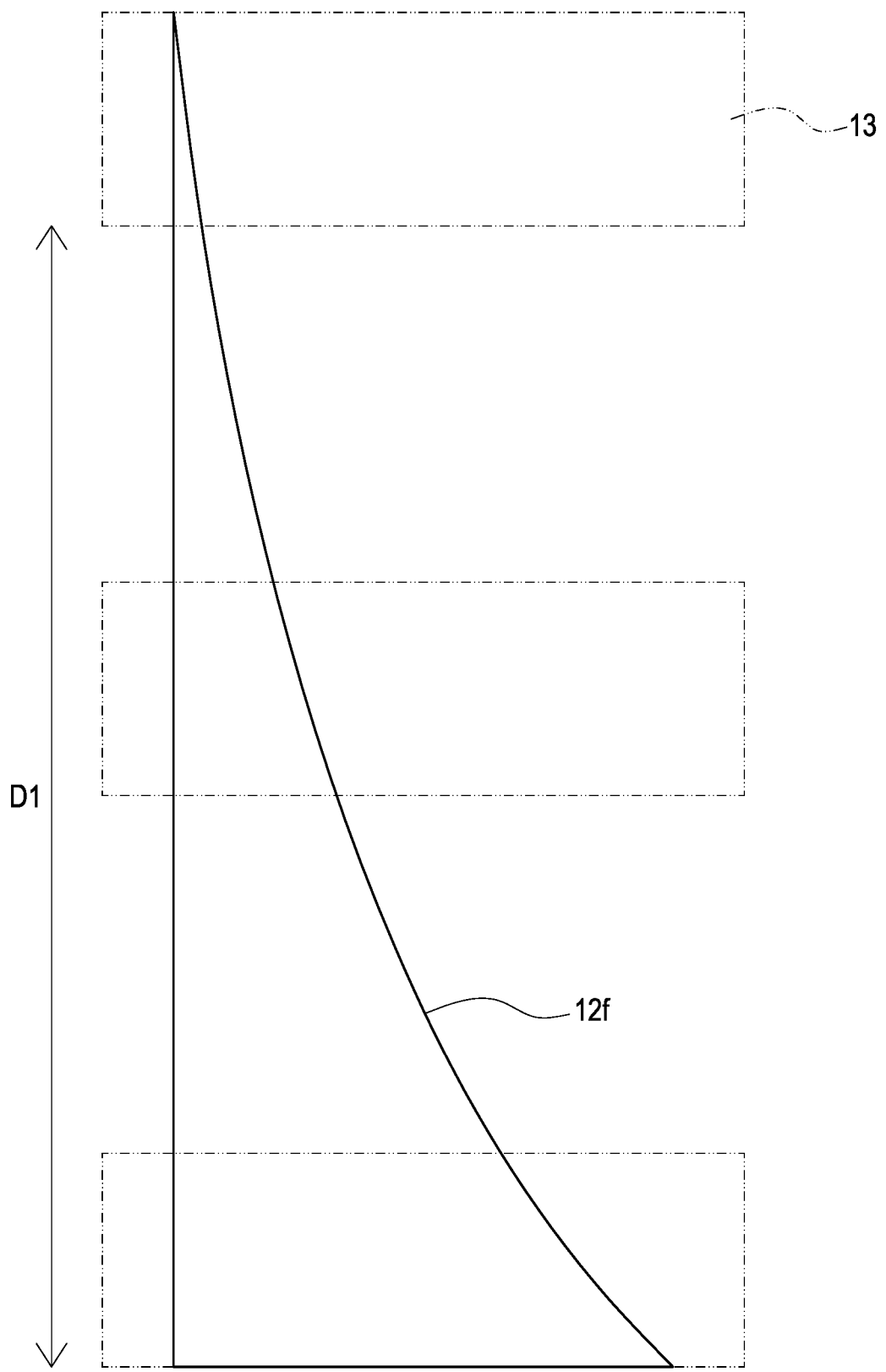
FIG. 4C is a schematic diagram of the overlapping portion between the conductor element and the sensing element of the disclosure.
Figure 4D:
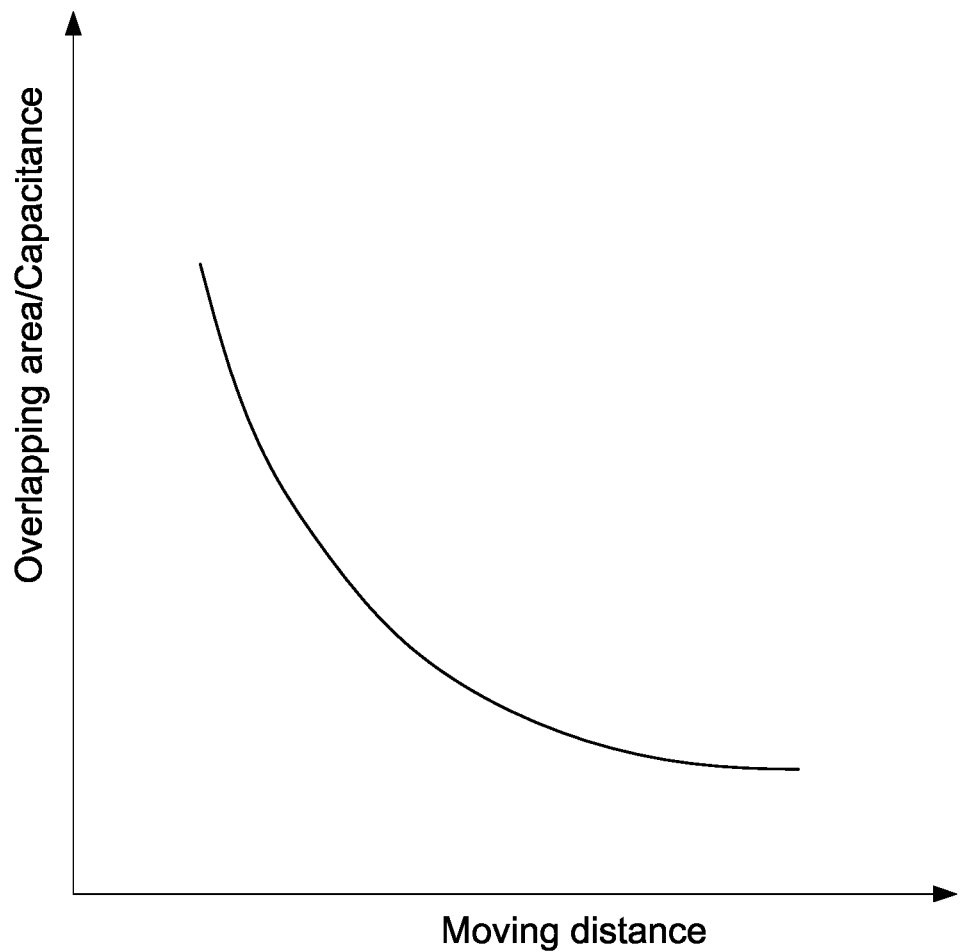
FIG. 4D is a schematic diagram of the capacitance change corresponding to the overlapping portion between the conductor element and the sensing element of the disclosure.

FIG. 4C is a schematic diagram of the overlapping portion between the conductor element 12f and the sensing element 13 of the disclosure. FIG. 4D is a schematic diagram of the capacitance change corresponding to the overlapping portion between the conductor element 12f and the sensing element 13 of the disclosure.

Referring to FIG. 4C and FIG. 4D, in some embodiments, the shape of the conductor element 12f is a triangle, and hypotenuse of the triangle is in a curve manner. Therefore, when the user pushes the sheet guiding component 11 to reciprocate along the first direction D1 to abut against the sheet, the sensing element 13 moves together with the sheet guiding element 11. The capacitance value C1 changes gradually with respect to the reciprocating of the sensing element 13 along the first direction D1, for example, increasing or decreasing in a curve manner. In other words, the overlapping area between the conductor element 12f and the sensing element 13 increases or decreases with respect to the reciprocating of the sensing element 13 along the first direction D1 in a curve manner.

Figure 4E:
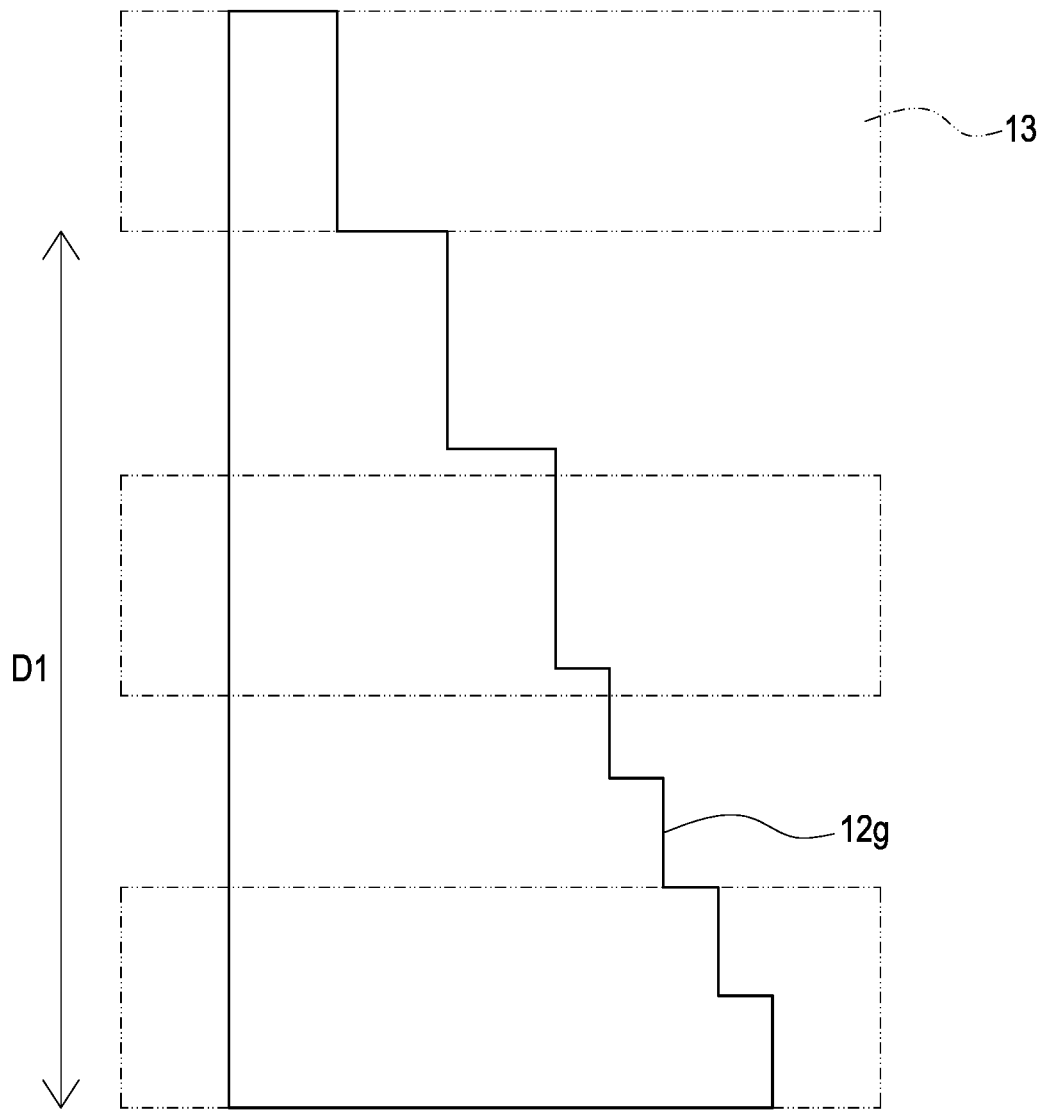
FIG. 4E is a schematic diagram of the overlapping portion between the conductor element and the sensing element of the disclosure.
Figure 4F:
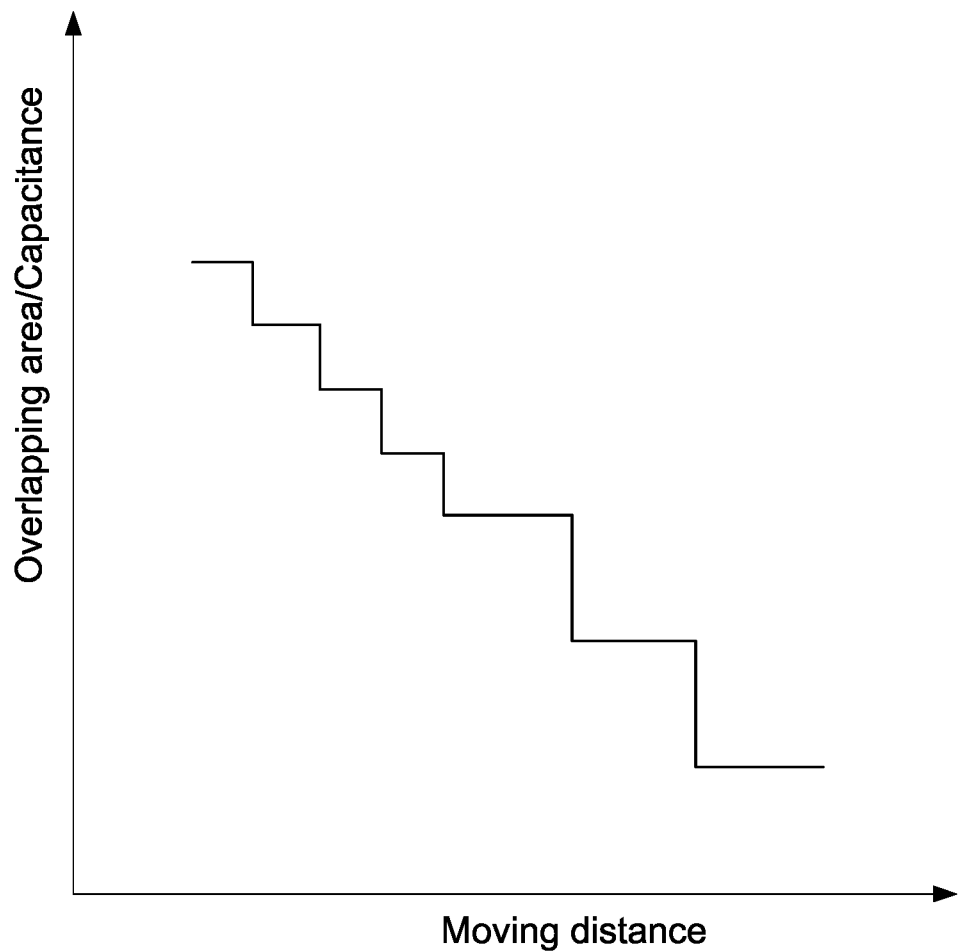
FIG. 4F is a schematic diagram of the capacitance change corresponding to the overlapping portion between the conductor element and the sensing element of the disclosure.

FIG. 4E is a schematic diagram of the overlapping portion between the conductor element 12g and the sensing element 13 of the disclosure. FIG. 4F is a schematic diagram of the capacitance change corresponding to the overlapping portion between the conductor element 12g and the sensing element 13 of the disclosure.

Referring to FIG. 4E and FIG. 4F, in some embodiments, the shape of the conductor element 12g is a stepped shape, and the width and height of each step in the stepped shape is not limiting. Therefore, when the user pushes the sheet guiding component 11 to reciprocate along the first direction D1 to abut against the sheet, the sensing element 13 moves together with the sheet guiding element 11. The capacitance value C1 changes gradually with respect to the reciprocating of the sensing element 13 along the first direction D1, for example, increasing or decreasing in a stepped manner. In other words, the overlapping area between the conductor element 12g and the sensing element 13 increases or decreases with respect to the reciprocating of the sensing element 13 along the first direction D1 in a stepped manner. It should be noted that the increasing or decreasing in the stepped manner indicates that the change is gradually increasing or decreasing along the first direction D1 in a stepped shape.

In summary, the conductor element 12 of the sheet detection device 1 in the disclosure is disposed in the sheet tray 9, and is continuously extended between the initial position P1 and the threshold position P2 where the sheet guiding component 11 is movable. The sensing element 13 disposed on the sheet guiding component 11 overlaps with at least a part of the conductor element 12 to generate the capacitance value C1. Therefore, when the sensing element 13 moves along the first direction D1, the capacitance value C1 between the sensing element 13 and the conductor element 12 increases or decreases gradually. As a result, when the sheet guiding component 11 correspondingly abuts against the sheet in any size to be located at any position, the capacitance value C1 is generated between the sensing element 13 and the conductor element 12, and the sheet size may be precisely detected based on the capacitance value C1.

Figure 5:
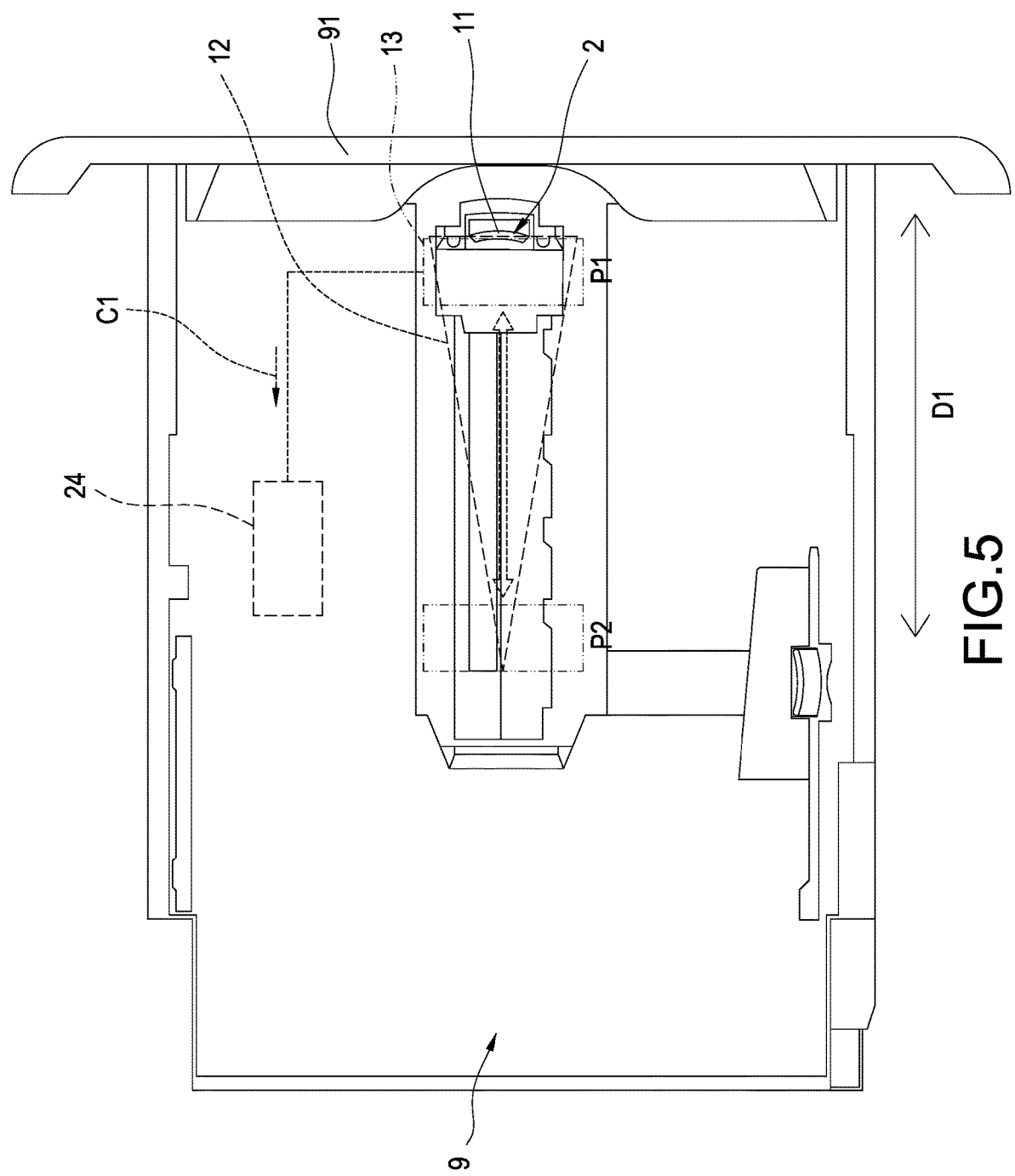
FIG. 5 is a schematic diagram of a sheet detection device in accordance with the second embodiment of the disclosure.

FIG. 5 is a schematic diagram of a sheet detection device 2 in accordance with the second embodiment of the disclosure. The sheet detection device 2 includes the sheet guiding component 11, the conductor element 12, the sensing element 13 and a processing element 24. The sheet guiding component 11, the conductor element 12 and the sensing element 13 are similar to those in the sheet detection device 1, and here is omitted for brevity. The difference between the sheet detection device 2 and the sheet detection device 1 is that the processing element 24 is electrically connected with the sensing element 13 to receive the capacitance value C1.

As a result, the processing element 24 is configured to receive the capacitance value C1 through the sensing element 13 to more precisely detect the sheet size. Further, the arranging manners of the sheet detection device 2 may be increased.

Figure 6:
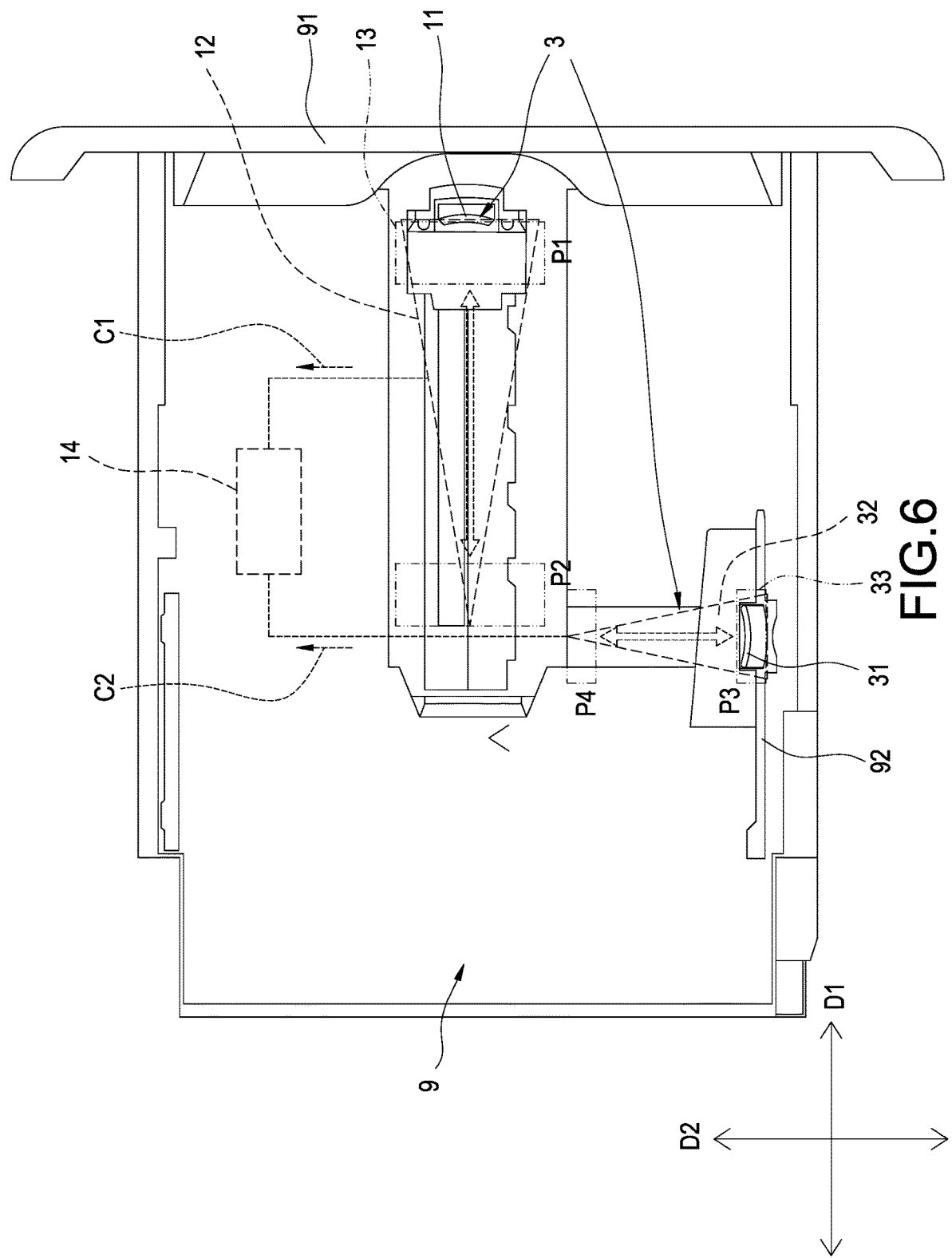
FIG. 6 is a schematic diagram of a sheet detection device in accordance with the third embodiment of the disclosure.

FIG. 6 is a schematic diagram of a sheet detection device 3 in accordance with the third embodiment of the disclosure. The sheet detection device 3 similarly includes the sheet guiding component 11, the conductor element 12, the sensing element 13 and the processing element 14. The sheet guiding component 11, the conductor element 12, the sensing element 13 and the processing element 14 are similar to those in the sheet detection device 1, and here is omitted for brevity. The difference between the sheet detection device 3 and the sheet detection device 1 is that the sheet detection device 3 further includes the sheet guiding component (for example, second sheet guiding component) 31, the conductor element (for example, third conductor element) 32 and the sensing element (for example, second sensing element) 33.

The sheet guiding component 31 is disposed in the sheet tray 9, and is movable between an initial position P3 and a threshold position P4 along a second direction D2. In some embodiments, the second direction D2 may be, for example, the short-side (or short-axis) direction of the sheet tray 9, and perpendicular to the first direction D1. The initial position P3 is the outermost position of sheet guiding component 31 in the sheet tray 9, for example, the position that the sheet guiding component 31 abuts against the side wall 92 of the sheet tray 9. The threshold position P4 is the final position that the sheet guiding component 31 may move to in the sheet tray 9 along the second direction D2, namely, the farthest position of the sheet guiding component 31 moving along the second direction D2 from the side wall 92 of the sheet tray 9. It should be noted that the user may make the sheet guiding component 31 move along the second direction D2, and make the sheet guiding component 31 stop at any position between the initial position P3 and the threshold position P4.

The conductor element 32 is disposed in the sheet tray 9. The conductor element 32 is designed to be a conductor continuously extended and conductive in full-sheet based on the demands, and arranged correspondingly between the initial position P3 and the threshold position P4 along the second direction D2. The conductor element 32 may be, for example, disposed on the bottom side or side wall of the sheet tray 9. In some embodiments, when the conductor element 32 is disposed on the bottom side of the sheet tray 9, the conductor element 32 is located below the sheet guiding component 31 correspondingly. In some other embodiments, when the conductor element 32 is disposed on the side wall of the sheet tray 9, the conductor element 32 is correspondingly located adjacent to the sheet guiding component 31 on the lateral side (not shown in figures). It should be noted that, in FIG. 6, the shape of the conductor element 32 is using an isosceles triangle as an example, and the bottom edge of the isosceles triangle is disposed adjacently to the side wall 92 (that is, the initial position P3) of the sheet tray 9 and the side edges of the isosceles triangle are extended toward the threshold position P4 along the second direction D2, here is not intended to be limiting. Further, the shape of the conductor element 32 may have different modifications as shown in FIG. 3A to FIG. 3E, FIG. 4C and FIG. 4E. The main requirement is that the area is gradually increased or decreased along the second direction (that is, the short-side direction of the sheet tray). It is worth mentioning that the proportion between the conductor element 32 and the conductor element 12 is not limiting.

The sensing element 33 is disposed on and linked up with the sheet guiding component 31. The sensing element 33 is disposed in spaced with the conductor element 32 and overlaps with at least a part of the conductor element 32. In some embodiments, the sensing element 33 is, for example, made of conductor material. When the conductor element 32 is disposed on the bottom side of the sheet tray 9, the sensing element 33 is disposed on the bottom side of the sheet guiding component 31 and configured to move along the second direction D2 following the sheet guiding component 31. In some other embodiments, When the conductor element 32 is disposed on the side wall of the sheet tray 9, the sensing element 33 may be disposed on the lateral side of the sheet guiding component 31 through an extending structure (not shown in figures) to keep a predetermined distance with the conductor element 32, and configured to move along the second direction D2 following the sheet guiding component 31. The shape of the sensing element 33 may be corresponding to the shape of the bottom side of the sheet guiding component 31, here is not intended to be limiting. A gap is defined between the sensing element 33 and the conductor element 32. In some embodiments, the gap may be, for example, greater than or equal to 3 mm, and less than or equal to 10 mm. The main requirement is to obtain desirable capacitance value between the sensing element 33 and the conductor element 32, here is not intended to be limiting.

Under top view, the sensing element 33 overlaps with at least a part of the conductor element 32. The overlapping portion between the conductor element 32 and the sensing element 33 generates a capacitance value C2 correspondingly. In some embodiments, the overlapping area of the overlapping portion between the conductor element 32 and the sensing element 33 is less than the sensing area of the sensing element 33. In other words, no matter where the sensing element 33 is located, at least a part of the sensing element 33 is not overlapped with the conductor element 32. As a result, the desirable capacitance value may be obtained between the sensing element 33 and the conductor element 32.

In some embodiments, the processing element 14 is electrically connected with the conductor elements 12, 32 to receive the capacitance values C1, C2, here is not intended to be limiting.

In some embodiments, the structure of the sheet guiding component 31, conductor element 32 and sensing element 33 may be similar to the structure of the sheet guiding component 11, conductor element 12 and sensing element 13, the difference is that the sheet guiding component 31, conductor element 32 and sensing element 33 are disposed to move along the short-side direction (second direction D2) of the sheet tray 9. In some embodiments, the sizes of the sheet guiding component 31, conductor element 32 and sensing element 33 may be smaller than the sizes of the sheet guiding component 11, conductor element 12 and sensing element 13.

In summary, the sheet detection device 3 of the disclosure further includes the sheet guiding component 31, conductor element 32 and sensing element 33 disposed on the second direction D2 (short-axis direction). As a result, the long-axis size of the sheet may be precisely detected by the sheet guiding component 11, conductor element 12 and sensing element 13 on the first direction D1 (long-axis direction), and the short-axis size of the sheet may be precisely detected by the sheet guiding component 31, conductor element 32 and sensing element 33 on the second direction D2 (short-axis direction).

FIG. 7 is a schematic diagram of a sheet detection device 4 in accordance with the fourth embodiment of the disclosure. The sheet detection device 4 includes the sheet guiding components 11, 31, the conductor elements 12, 32, the sensing elements 13, 33 and the processing element 24. The sheet guiding components 11, 31, the conductor elements 12, 32 and the sensing elements 13, 33 are similar to those in the sheet detection device 3, and here is omitted for brevity. The difference between the sheet detection device 4 and the sheet detection device 3 is that the processing element 24 is electrically connected with the sensing elements 13, 33 to receive the capacitance values C1, C2.

As a result, the processing element 24 is configured to receive the capacitance values C1, C2 through the sensing elements 13, 33 to more precisely detect the sheet size. Further, the arranging manners of the sheet detection device 4 may be increased.

FIG. 8 is a schematic diagram of a sheet detection device 5 in accordance with the fifth embodiment of the disclosure. The sheet detection device 5 includes the sheet guiding component 11, the sensing element 13 and the processing element 24. The sheet guiding component 11, the sensing element 13 and the processing element 14 are similar to those in the sheet detection device 1, and here is omitted for brevity. The difference between the sheet detection device 5 and the sheet detection device 1 is that the sheet detection device 5 includes a conductor element 52a (for example, first conductor element) and a conductor element 52b (for example, second conductor element). The conductor element 52a and the conductor element 52b are both disposed in the sheet tray 9 and located below the sheet guiding component 11. The conductor elements 52a, 52b are designed to be the conductor continuously extended and conductive in full-sheet based on the demands, and arranged correspondingly between the initial position P1 and the threshold position P2 along the first direction D1. The conductor element 52b is disposed adjacently with the conductor element 52a, and both are electrically connected with the processing element 14. The conductor element 52a and the conductor element 52b are spaced from each other with a gap.

It should be noted that, in FIG. 8, the shapes of the conductor element 52a and the conductor element 52b are using the right triangle as an example. The bottom edge of the conductor element 52a is disposed adjacently to the side wall 91 (that is, the initial position P1) of the sheet tray 9 and the side edges of the conductor element 52a are extended toward the threshold position P2 along the first direction D1. The bottom edge of the conductor element 52b is disposed adjacently to the threshold position P2 of the sheet tray 9 and the side edges of the conductor element 52b are extended toward the initial position P1 along the first direction D1, here is not intended to be limiting.

It is worth mentioning that the shapes of the conductor element 52a and the conductor element 52b are not limiting, the main requirements are that the area is gradually increased or decreased along the first direction (that is, the long-side direction of the sheet tray) and the combined shape of the two is corresponding to the shape of the sensing element 13. The combined shape of the conductor element 52a and the conductor element 52b being corresponding to the shape of the sensing element 13 indicates that the combined shape of the overlapping portion (for example, first overlapping portion) between the conductor element 52a and the sensing element 13 and the overlapping portion (for example, second overlapping portion) between the conductor element 52b and the sensing element 13 is substantially the same or similar with the shape of the sensing element 13.

Under top view, the sensing element 13 overlaps with at least a part of the conductor elements 52a, 52b. The overlapping portion (for example, first overlapping portion) between the conductor element 52a and the sensing element 13 generates a capacitance value (for example, first capacitance value) C1 correspondingly. The overlapping portion (for example, second overlapping portion) between the conductor element 52b and the sensing element 13 generates a capacitance value (for example, second capacitance value) C2 correspondingly. In some embodiments, when the sensing element 13 is located at the initial position P1 or the threshold position P2, the overlapping area of the overlapping portion between the conductor element 52a and the sensing element 13 and the overlapping area of the overlapping portion between the conductor element 52b and the sensing element 13 are different, and the total area of the overlapping areas is less than the sensing area of the sensing element 13.

The processing element 14 may be electrically connected with the conductor elements 52a, 52b, and configured to receive the capacitance value C1 corresponding to the overlapping area between the conductor element 52a and the sensing element 13 and the capacitance value C2 corresponding to the overlapping area between the conductor element 52b and the sensing element 13. The capacitance values C1, C2 change gradually with respect to the reciprocating of the sensing element 13 along the first direction D1. In some embodiments, the gradual changing may be, for example, increasing or decreasing in a linear, a curve, or a stepped manner. In some embodiments, when the capacitance value C1 increases in the linear, curve, or stepped manner, the capacitance value C2 decreases in the linear, curve, or stepped manner, and vice versa. Further, when the sensing element 13 is located at the initial position P1 or the threshold position P2, the capacitance value C1 and the capacitance value C2 are different. In some embodiments, when the sensing element 13 is located at different positions, the capacitance ratio (for example, first capacitance ratio) between the capacitance value C1 and the capacitance value C2 may be equal to different predetermined value (for example, first predetermined value).

Figure 9A:
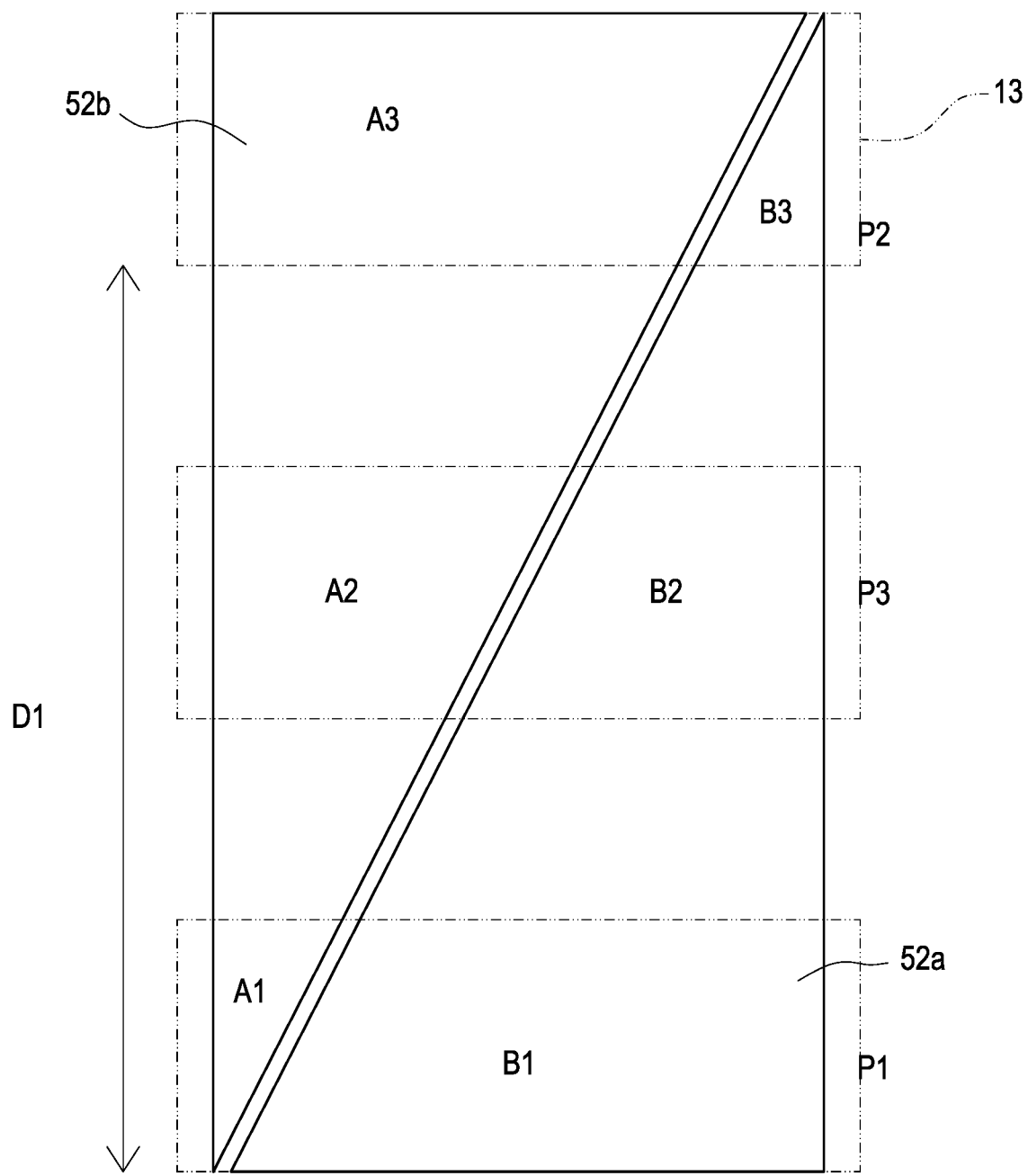
FIG. 9A is a schematic diagram of the overlapping portion between the conductor elements and the sensing element of the disclosure.
Figure 9B:
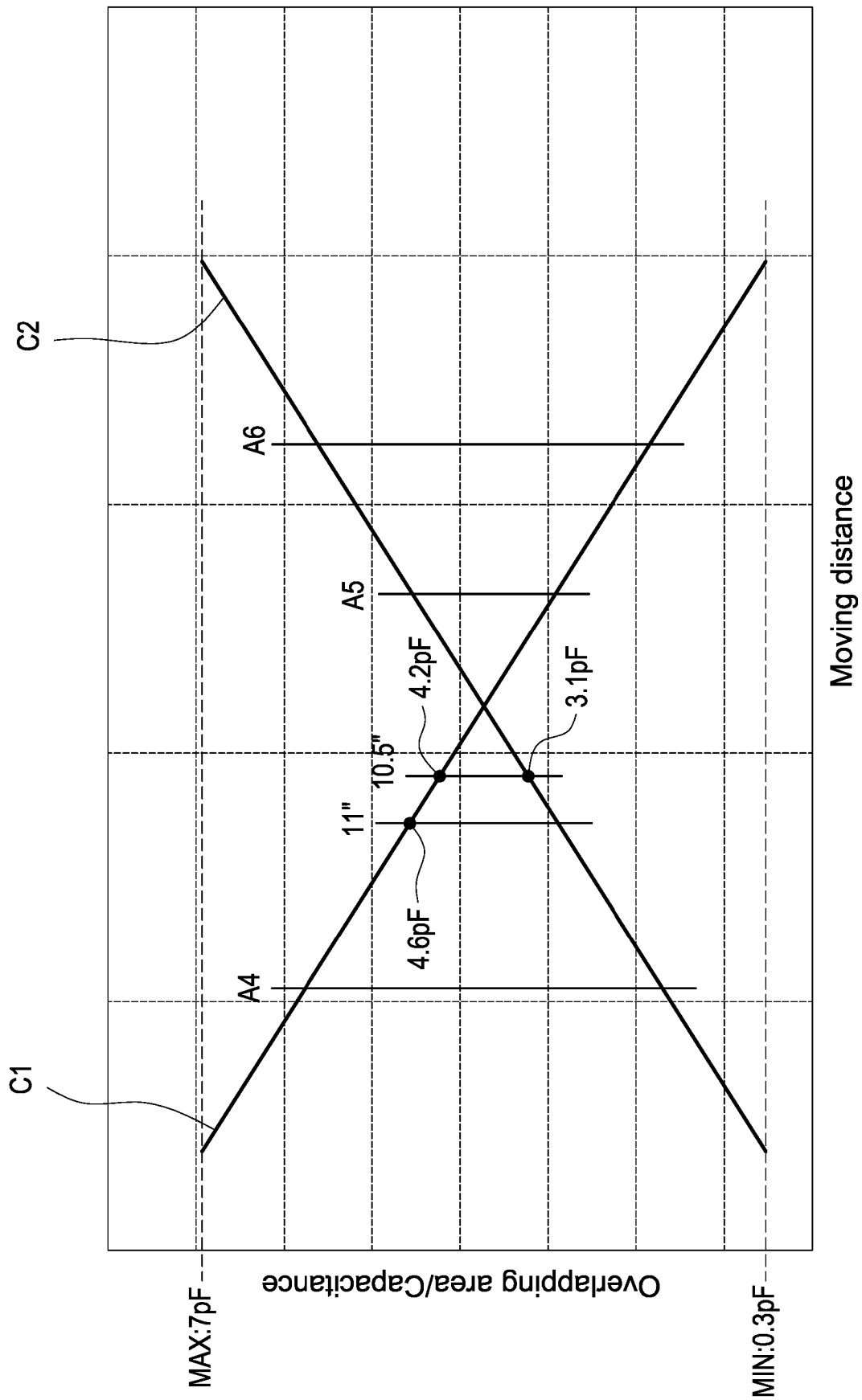
FIG. 9B is a schematic diagram of the capacitance change corresponding to the overlapping portion between the conductor elements and the sensing element of the disclosure.
Figure 9C:
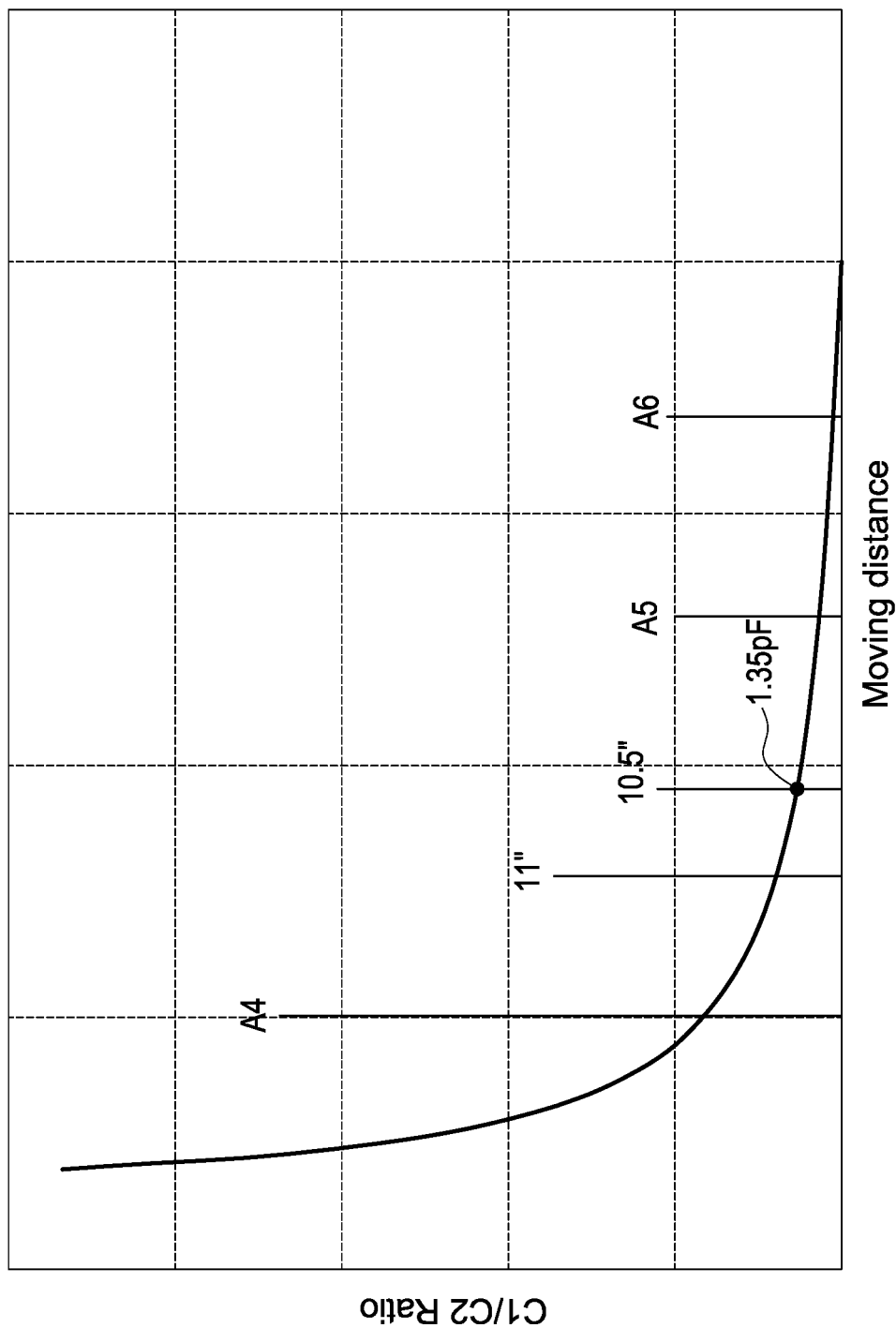
FIG. 9C is a schematic diagram of the capacitance ratio corresponding to the overlapping portion between the conductor elements and the sensing element of the disclosure.

FIG. 9A is a schematic diagram of the overlapping portion between the conductor elements 52a, 52b and the sensing element 13 of the disclosure. FIG. 9B is a schematic diagram of the capacitance change corresponding to the overlapping portion between the conductor elements 52a, 52b and the sensing element 13 of the disclosure. FIG. 9C is a schematic diagram of the capacitance ratio corresponding to the overlapping portion between the conductor elements 52a, 52b and the sensing element 13 of the disclosure.

Referring to FIG. 8, FIG. 9A, FIG. 9B, and FIG. 9C, when the user pushes the sheet guiding component 11 to reciprocate along the first direction D1 to abut against the sheet, the sensing element 13 moves together with the sheet guiding element 11. The capacitance values C1, C2 change gradually with respect to the reciprocating of the sensing element 13 along the first direction D1, for example, increasing or decreasing in a linear manner. In other words, the overlapping areas between the conductor elements 52a, 52b and the sensing element 13 increases or decreases gradually with respect to the reciprocating of the sensing element 13 along the first direction D1. The processing element 14 is configured to receive the capacitance values C1, C2 corresponding to the overlapping areas.

For example, when the sensing element 13 is located at the initial position P1, the overlapping area B1 between the conductor element 52a and the sensing element 13 is largest, the overlapping area A1 between the conductor element 52b and the sensing element 13 is smallest, and thus the capacitance value C1 between the conductor element 52a and the sensing element 13 is largest, the capacitance value C2 between the conductor element 52b and the sensing element 13 is smallest. When the processing element 14 receives the capacitance values C1, C2, the processing element 14 is configured to determine that the sheet guiding component 11 is located at the initial position P1 according to the capacitance values C1, C2. In some embodiments, the processing element 14 is configured to calculate the capacitance ratio of the capacitance values C1, C2 corresponding to the overlapping area A1 and overlapping area B1. When the capacitance ratio is substantially equal to a predetermined value, the processing element 14 may compute current position of the sensing element 13 (and the sheet guiding component).

For another example, when the sensing element 13 is located at the threshold position P2, the overlapping area B3 between the conductor element 52a and the sensing element 13 is smallest, the overlapping area A3 between the conductor element 52b and the sensing element 13 is largest, and thus the capacitance value C1 between the conductor element 52a and the sensing element 13 is smallest, the capacitance value C2 between the conductor element 52b and the sensing element 13 is largest. When the processing element 14 receives the capacitance values C1, C2, the processing element 14 is configured to determine that the sheet guiding component 11 is located at the threshold position P2 according to the capacitance values C1, C2. In some embodiments, the processing element 14 is configured to calculate the capacitance ratio of the capacitance values C1, C2 corresponding to the overlapping area A3 and overlapping area B3 to compute current position of the sensing element 13 (and the sheet guiding component).

For another example, when the sensing element 13 is located at any position P3, the overlapping areas B2, A2 between the conductor elements 52a, 52b and the sensing element 13 are corresponding to some capacitance values C1, C2. When the processing element 14 receives the capacitance values C1, C2, the processing element 14 is configured to determine where the sheet guiding component 11 is located according to the capacitance values C1, C2. In some embodiments, the processing element 14 is configured to calculate the capacitance ratio of the capacitance values C1, C2 corresponding to the overlapping area A2 and overlapping area B2 to compute current position of the sensing element 13 (and the sheet guiding element).

Specifically, for example, if the capacitance values C1, C2 of the conductor elements 52a, 52b are assumed to have a maximal value of 7 pF and a minimal value of 0.3 pF, the proportion of the capacitance C1/the capacitance C2 is shown as FIG. 9C. Therefore, when the capacitance C1/the capacitance C2=4.2 pF/3.1 pF=1.35, size of the sheet may be determined to be 10.5 inches.

In other words, when the capacitance value of single conductor element 52a increases by 10% due to environmental change, that is, the capacitance value for sheet size in 10.5 inches is detected to be 4.62 pF due to environmental change instead of the correct value of 4.2 pF, the processing element 14 may mis-determine the sheet size to be 11 inches (as shown in FIG. 9B). On the other hand, if dual conductor elements 52a, 52b are used, the proportion of the capacitance C1/the capacitance C2 is 1.35 for sheet size in 10.5 inches with the capacitance C1 of 4.2 pF and the capacitance C2 of 3.1 pF, and the proportion of the capacitance C1/the capacitance C2 is still 1.35 with the capacitance C1 of 4.62 pF and the capacitance C2 of 3.41 pF, which are influenced by environment. Thus, referring to FIG. 9C, the sheet size may be consistently determined to be 10.5 inches.

Therefore, by pre-setting the capacitance values C1, C2 corresponding to the overlapping areas between the conductor elements 52a, 52b and the sensing element 13, the processing element 14 may determine the sheet size being abutted against by the sheet guiding component 11 according to the proportion of the capacitance values C1, C2.

In summary, the conductor elements 52a, 52b of the sheet detection device 5 in the disclosure is disposed in the sheet tray 9, and are continuously extended between the initial position P1 and the threshold position P2 where the sheet guiding component 11 is movable. The sensing element 13 disposed on the sheet guiding component 11 overlaps with at least a part of the conductor elements 52a, 52b to generate the capacitance values C1, C2. Therefore, when the sensing element 13 moves along the first direction D1, the capacitance values C1, C2 between the sensing element 13 and the conductor elements 52a, 52b increases or decreases gradually. As a result, when the sheet guiding component 11 correspondingly abuts against the sheet in any size to be located at any position, the capacitance values C1, C2 are generated between the sensing element 13 and the conductor elements 52a, 52b, and the sheet size may be precisely detected based on the proportion of the capacitance values C1, C2. Therefore, the position is determined by computing the proportion of the capacitance values, and the influence from the capacitance change due to environmental issue may be decreased and the result may be precisely obtained.

Figure 10:
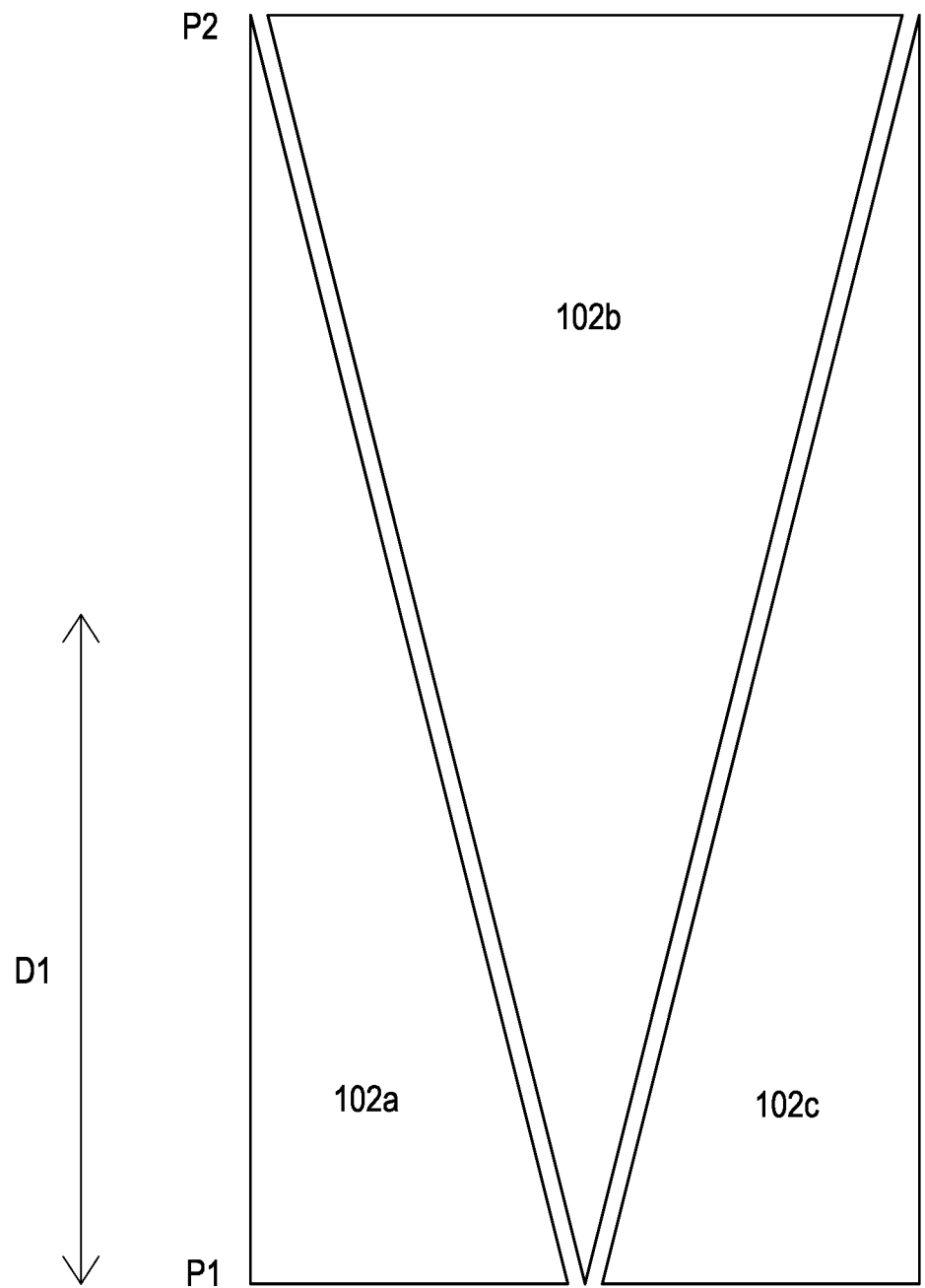
FIG. 10 is a schematic diagram of different types of conductor elements of the disclosure.

FIG. 10 is a schematic diagram of different types of conductor elements 102a-102c of the disclosure. The sheet detection device may include more than two conductor elements 102a-102c. The conductor element 102a and the conductor element 102c are both using the right triangle as examples. The bottom edges of the conductor element 102a and the conductor element 102c are disposed on the initial position P1 and the side edges of the conductor element 102a and the conductor element 102c are extended toward the threshold position P2 along the first direction D1. The bottom edge of the conductor element 102b is disposed on the threshold position P2 and the side edges of the conductor element 102b are extended toward the initial position P1 along the first direction D1.

It is worth mentioning that the shapes of the conductor element 102a-102c are not limiting, the main requirements are that the area is gradually increased or decreased along the first direction D1 (that is, the long-side direction of the sheet tray) and the combined shape of the conductor elements is corresponding to the shape of the sensing element.

The combined shape of the conductor elements 102a-102c being corresponding to the shape of the sensing element indicates that the combined shape of the overlapping portions between the conductor elements 102a-102c and the sensing element is substantially the same or similar with the shape of the sensing element.

FIG. 11 is a schematic diagram of a sheet detection device 6 in accordance with the sixth embodiment of the disclosure. The sheet detection device 6 similarly includes the sheet guiding component 11, the conductor elements 52a, 52b, the sensing element 13 and the processing element 14. The sheet guiding component 11, the conductor elements 52a, 52b, the sensing element 13 and the processing element 14 are similar to those in the sheet detection device 5, and here is omitted for brevity. The difference between the sheet detection device 6 and the sheet detection device 5 is that the sheet detection device 6 further includes the sheet guiding component 61, the conductor elements (for example, third conductor element and fourth conductor element) 62a, 62b and the sensing element 63. The sensing element 63 is disposed in spaced with the conductor elements 62a, 62b and overlaps with at least a part of the conductor elements 62a, 62b. The overlapping portion between each conductor element 62a, 62b and the sensing element 63 generates a capacitance value (for example, second capacitance value) correspondingly. A capacitance ratio (for example, second capacitance ratio) of the capacitance values of the conductor elements 62a, 62b is substantially equal to a predetermined value (for example, second predetermined value). In some embodiments, the combined shape of the overlapping portions between the conductor elements 62a, 62b and the sensing element 63 is substantially the same with the shape of the sensing element 63.

Similar to the sheet detection device 3 in FIG. 6, the structure of the sheet guiding component 61, conductor elements 62a, 62b and sensing element 63 may be similar to the structure of the sheet guiding component 11, conductor elements 52a, 52b and sensing element 13, the difference is that the sheet guiding component 61, conductor elements 62a, 62b and sensing element 63 are disposed to move along the short-side direction (second direction D2) of the sheet tray 9. In some embodiments, the sizes of the sheet guiding component 61, conductor elements 62a, 62b and sensing element 63 may be smaller than the sizes of the sheet guiding component 11, conductor elements 52a, 52b and sensing element 13.

As a result, the sheet detection device 6 of the disclosure further includes the sheet guiding component 61, conductor elements 62a, 62b and sensing element 63 disposed on the second direction D2 (short-axis direction). As a result, the long-axis size of the sheet may be precisely detected by the sheet guiding component 11, conductor elements 52a, 52b and sensing element 13 on the first direction D1 (long-axis direction), and the short-axis size of the sheet may be precisely detected by the sheet guiding component 61, conductor elements 62a, 62b and sensing element 63 on the second direction D2 (short-axis direction).

In summary, the conductor element of the sheet detection device in the disclosure is disposed in the sheet tray, and is continuously extended between the initial position and the threshold position where the sheet guiding component is movable. The sensing element disposed on the sheet guiding component overlaps with at least a part of the conductor element to generate the capacitance value. Therefore, when the sensing element moves along the first direction, the capacitance value between the sensing element and the conductor element increases or decreases gradually. As a result, when the sheet guiding component correspondingly abuts against the sheet in any size to be located at any position, the capacitance value is generated between the sensing element and the conductor element, and the sheet size may be precisely detected based on the capacitance value.

Further, the sheet detection device of the disclosure may further include the sheet guiding component, conductor element and sensing element disposed on the second direction (short-axis direction). As a result, the long-axis size of the sheet may be precisely detected by the sheet guiding component, conductor element and sensing element on the first direction (long-axis direction), and the short-axis size of the sheet may be precisely detected by the sheet guiding component, conductor element and sensing element on the second direction (short-axis direction).

Moreover, the sheet detection device of the disclosure may further include a plurality of conductor elements with a combined shape substantially the same or similar with the shape of the sensing element. As a result, the position is determined by computing the proportion of the capacitance values, and the influence from the capacitance change due to environmental issue may be decreased and the result may be precisely obtained.

The above is only a detailed description and drawings of the embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A sheet detecting device, comprising:
   a first sheet guiding component, disposed in a sheet tray, and movable between an initial position and a threshold position along a first direction;
   a first conductor element, disposed in the sheet tray along the first direction, being conductor continuously extended, and arranged correspondingly between the initial position and the threshold position; and
   a first sensing element, disposed on and linked up with the first sheet guiding component, and disposed in spaced with the first conductor element and overlapping with at least a part of the first conductor element;
   wherein a first overlapping portion between the first conductor element and the first sensing element correspondingly generates a first capacitance value, and the first capacitance value changes gradually corresponding to movement of the first sensing element along the first direction.

2. The sheet detecting device according to claim 1, further comprising:
   a processing element, electrically connected with the first sensing element or the first conductor element, and configured to receive the first capacitance value.

3. The sheet detecting device according to claim 1, wherein an overlapping area of the first overlapping portion is less than a sensing area of the first sensing element.

4. The sheet detecting device according to claim 1, further comprising:
   a second conductor element, disposed in the sheet tray along the first direction, being conductor continuously extended, arranged correspondingly between the initial position and the threshold position, and disposed adjacently to the first conductor element.

5. The sheet detecting device according to claim 4, wherein a second overlapping portion between the second conductor element and the first sensing element correspondingly generates a second capacitance value, and the second capacitance value changes gradually corresponding to movement of the first sensing element along the first direction.

6. The sheet detecting device according to claim 5, further comprising:
a processing element, electrically connected with the first conductor element and the second conductor element, and configured to receive the first capacitance value and the second capacitance value.

7. The sheet detecting device according to claim 5, wherein when the first sensing element is located at the initial position or the threshold position on the first direction, the first capacitance value is different from the second capacitance value.

8. The sheet detecting device according to claim 7, wherein when the first capacitance value increases gradually, the second capacitance value decreases gradually.

9. The sheet detecting device according to claim 6, wherein a combined shape from the first overlapping portion and the second overlapping portion is substantially same with a shape of the first sensing element.

10. The sheet detecting device according to claim 1, wherein the first capacitance value increases or decreases in a linear, a curve, or a stepped manner.

11. The sheet detecting device according to claim 1, further comprising:
a second sheet guiding component, disposed in the sheet tray, and movable between an initial position and a threshold position along a second direction, wherein the second direction is perpendicular to the first direction;
a third conductor element, disposed in the sheet tray along the second direction, being conductor continuously extended, and arranged correspondingly between the initial position and the threshold position along the second direction; and
a second sensing element, disposed on and linked up with the second sheet guiding component, and disposed in spaced with the third conductor element and overlapping with at least a part of the third conductor element;
wherein a third overlapping portion between the third conductor element and the second sensing element correspondingly generates a third capacitance value, and the third capacitance value changes gradually corresponding to movement of the second sensing element along the second direction.

12. The sheet detecting device according to claim 11, further comprising:
a fourth conductor element, disposed in the sheet tray along the second direction, being conductor continuously extended, arranged correspondingly between the initial position and the threshold position along the second direction, and disposed adjacently to the third conductor element.

13. The sheet detecting device according to claim 12, wherein a fourth overlapping portion between the fourth conductor element and the second sensing element correspondingly generates a fourth capacitance value, and the fourth capacitance value changes gradually corresponding to movement of the second sensing element along the second direction.

14. A sheet detecting device, comprising:
a first sheet guiding component, disposed in a sheet tray, and movable between an initial position and a threshold position along a first direction;
a plurality of conductor elements, each conductor element disposed in the sheet tray along the first direction and being conductor continuously extended, and arranged correspondingly between the initial position and the threshold position; and
a first sensing element, disposed on and linked up with the first sheet guiding component, and disposed in spaced with the conductor elements and overlapping with at least a part of the conductor elements;
wherein an overlapping portion between each conductor element and the first sensing element correspondingly generates a first capacitance value, and a first capacitance ratio of a plurality of first capacitance values of the conductor elements is substantially equal to a first predetermined value, corresponding to the first sensing element moves along the first direction.

15. The sheet detecting device according to claim 14, further comprising:
a processing element, electrically connected with the conductor elements, and configured to receive the first capacitance values.

16. The sheet detecting device according to claim 14, wherein when the first sensing element is located at the initial position or the threshold position on the first direction, the first capacitance values are different from one another.

17. The sheet detecting device according to claim 14, wherein a combined shape from a plurality of overlapping portions between the conductor elements and the first sensing element is substantially same with a shape of the first sensing element.

18. The sheet detecting device according to claim 17, wherein a total area of the overlapping portions is less than a sensing area of the first sensing element.

19. The sheet detecting device according to claim 14, further comprising:
a second sheet guiding component, disposed in the sheet tray, and movable between an initial position and a threshold position along a second direction, wherein the second direction is perpendicular to the first direction; and
a second sensing element, disposed on and linked up with the second sheet guiding component;
wherein the conductor elements are also disposed along the second direction and arranged correspondingly between the initial position and the threshold position along the second direction, the second sensing element is disposed in spaced with the conductor elements and overlaps with at least a part of the conductor elements,
an overlapping portion between each conductor element and the second sensing element correspondingly generates a second capacitance value, and a second capacitance ratio of a plurality of second capacitance values of the conductor elements is substantially equal to a second predetermined value, corresponding to the second sensing element moves along the second direction.

20. The sheet detecting device according to claim 19, wherein a combined shape from a plurality of overlapping portions between the conductor elements and the second sensing element is substantially same with a shape of the second sensing element.

* * * * *